US006473688B2

(12) United States Patent
Kohno et al.

(10) Patent No.: US 6,473,688 B2
(45) Date of Patent: Oct. 29, 2002

(54) TRAFFIC INFORMATION TRANSMITTING SYSTEM, TRAFFIC INFORMATION COLLECTING AND DISTRIBUTING SYSTEM AND TRAFFIC INFORMATION COLLECTING AND DISTRIBUTING METHOD

(75) Inventors: Atsushi Kohno, Tokyo (JP); Kazuma Kaneko, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/887,529

(22) Filed: Jun. 25, 2001

(65) Prior Publication Data

US 2002/0049527 A1 Apr. 25, 2002

(30) Foreign Application Priority Data

Aug. 29, 2000 (JP) ...................................... 2000-259205

(51) Int. Cl.[7] ................................................ G06F 7/70
(52) U.S. Cl. ...................................... 701/117; 701/213
(58) Field of Search ................................ 701/117, 118, 701/119, 208, 209, 211, 213, 24; 340/933

(56) References Cited

U.S. PATENT DOCUMENTS 6,304,758 B1 * 10/2001 Iierbig et al. ............... 701/117
6,411,221 B2 * 1/2002 Hörber ....................... 701/117
6,384,739 B1 * 5/2002 Robert, Jr. .................. 701/117
6,397,141 B1 * 5/2002 Binnig ....................... 701/117
6,401,027 B1 * 6/2002 Xa et al. .................... 701/117
6,411,889 B1 * 6/2002 Mizunuma et al. ......... 701/117

FOREIGN PATENT DOCUMENTS

JP 9-236650 9/1997
JP 10-84430 3/1998
JP 11-183184 7/1999

* cited by examiner

*Primary Examiner*—Richard M. Camby
(74) *Attorney, Agent, or Firm*—Leydig, Voit & Mayer, Ltd.

(57) ABSTRACT

A traffic information detecting and distributing system including receiver for receiving current position information transmitted from a traffic information transmitting system for detecting and transmitting the current position information of a moving object, a traffic information collector for forming traffic information based on the current position information received, a traffic information distributor for distributing the traffic information to a traffic information user, a user identifier for identifying the traffic information user based on traffic information user identifying information, and a charging system for a charging the traffic information user for the traffic information used, based on the user identifying information. A traffic information transmitting system, a traffic information collecting and distributing system, and a traffic information collecting and distributing method provide traffic information over a wide range and properly charge for the traffic information use.

9 Claims, 22 Drawing Sheets

FIG.4

301

| PATH | NUMBER OF MOVING OBJECT | AVERAGE SPEED (km/h) |
|---|---|---|
| A→B | 3 | 60 |
| B→A | 1 | 75 |
| B→D | 0 | 0 |
| D→B | 1 | 80 |
| B→C | 1 | 40 |
| C→B | 1 | 45 |
| E→C | 0 | 0 |
| C→E | 1 | 75 |
| F→C | 2 | 40 |
| C→F | 2 | 25 |
| E→D | 0 | 0 |
| D→E | 0 | 0 |

FIG.5

302

| MOVING OBJECT ID | LATITUDE | LONGITUDE | PATH |
|---|---|---|---|
| PASSENGER VEHICLE 1 | N:.34.41.0.0 | E:135.42.0.0 | A→B |
| PASSENGER VEHICLE 2 | N:.34.41.0.0 | E:135.35.0.0 | A→B |
| PASSENGER VEHICLE 3 | N:.34.41.0.0 | E:135.33.0.0 | B→A |
| PASSENGER VEHICLE 4 | N:.34.41.0.0 | E:136.5.0.0 | C→F |
| PASSENGER VEHICLE 5 | N:.34.41.0.0 | E:136.25.0.0 | F→C |
| PASSENGER VEHICLE 6 | N:.35.21.0.0 | E:135.49.0.0 | D→B |
| PASSENGER VEHICLE 7 | N:.35.21.0.0 | E:136.09.0.0 | C→E |
| TRUCK 1 | N:.34.41.0.0 | E:135.32.0.0 | A→B |
| TRUCK 2 | N:.34.41.0.0 | E:135.56.0.0 | C→B |
| TRUCK 3 | N:.34.41.0.0 | E:135.50.0.0 | B→C |
| TRUCK 4 | N:.34.41.0.0 | E:136.12.0.0 | F→C |
| TRUCK 5 | N:.34.41.0.0 | E:136.20.0.0 | C→F |

FIG.7

303

| TRAFFIC INFORMATION USER | NUMBER OF TIME OF DISTRIBUTION |
|---|---|
| USER 3A | 35 |
| USER 3B | 120 |
| USER 3C | 80 |
| USER 3D | 75 |
| USER 3E | 65 |
| USER 3F | 130 |

306

| PATH | NUMBER OF VEHICLE | AVERAGE SPEED (km/h) |
|---|---|---|
| A→B | 3 | 60 |
| B→A | 1 | 75 |

307

| TRAFFIC INFORMATION USER ID | USED TRAFFIC INFORMATION AMOUNT |
|---|---|
| USER 3A | 2 |

308

| AREA | NUMBER OF VEHICLE | AVERAGE SPEED (km/h) |
|---|---|---|
| All | 12 | 52.1 |

(a)TRAFFIC INFORMATION OF LEVEL 1

309

| AREA | NUMBER OF VEHICLE | AVERAGE SPEED (km/h) |
|---|---|---|
| A,B,D | 5 | 67 |
| B,D,E,C,F | 7 | 41.4 |

(b)TRAFFIC INFORMATION OF LEVEL 2

310

| AREA | NUMBER OF VEHICLE | AVERAGE SPEED (km/h) |
|---|---|---|
| A—B | 4 | 63.8 |
| B—D | 1 | 80 |
| B—C | 2 | 42.5 |
| C—E | 1 | 75 |
| D—E | 4 | 32.5 |
| C—F | 0 | 0 |

(c) TRAFFIC INFORMATION OF LEVEL 3

| PATH | FACILITY | POINTER TO FACILITY DATA |
|---|---|---|
| A-B | CONVENIENCE STORE X | DATA No. 0084 |
| | CONVENIENCE STORE Y | DATA No. 0116 |
| | GAS STATION A | DATA No. 1099 |
| | GAS STATION B | DATA No. 1090 |
| | CAR DEALER XX | DATA No. 0007 |
| | CAR DEALER YY | DATA No. 0103 |
| B-C | CONVENIENCE STORE Z | DATA No. 6500 |
| | GAS STATION C | DATA No. 0011 |
| | ... | ... |
| ... | ... | ... |

TRAFFIC INFORMATION TRANSMITTING SYSTEM, TRAFFIC INFORMATION COLLECTING AND DISTRIBUTING SYSTEM AND TRAFFIC INFORMATION COLLECTING AND DISTRIBUTING METHOD

BACKGROUND OF THE INVENTION

1. Field of the Invention

The present invention relates to a traffic information transmitting system for detecting and transmitting a current position of a moving object such as a person or an automobile. Further, the invention relates to a traffic information collecting and distributing system and a traffic information collecting and distributing method for forming traffic information based on collected information of a current position and distributing formed traffic information to a traffic information user.

2. Description of the Related Art

Heretofore, according to a traffic information collecting and distributing system, traffic information actually observed by using a helicopter or a vehicle for monitoring is collected and informed to a driver of a moving object such as a vehicle via broadcast media such as radio.

However, as a traffic information collecting and distributing system of recent times, there is reduced into practice, for example, VICS (Vehicle Information and Communication System). In VICS, a traffic information center detects and accumulates a traffic situation such as traffic jam, traffic control, a required time period or a state of parking lots in a monitoring object area from cameras or sensors installed at roads and provides accumulated traffic situation data directly to a driver via a communication apparatus referred to as beacon apparatus. Further, according to ATIS (Advanced Traffic Information Service), a driver obtains a traffic situation by using portable telephone.

Further, in Japanese Patent Laid-Open No. Hei 11-183184, there is pointed out a technology in which, with an object of grasping traffic information further accurately and supplying the traffic information to respective vehicles, a traffic jam is predicted by current positions of respective vehicles via a public communication network by using in-vehicle terminals connected to the public communication network and predicted traffic jam information is provided to the in-vehicle terminals upon a request.

FIG. 27 is a constitution view showing a traffic information system in Japanese Patent Laid-Open No. Hei 11-183184, numeral 1 designates a moving object position detecting and transmitting apparatus installed in respective vehicles, numeral 2 designates an information center, numeral 4 designates a GPS satellite, numeral 5 designates a portable telephone base station, and numeral 6 designates a general public telephone network. Further, the moving object position detecting and transmitting apparatus 1 is constituted by a car navigation apparatus and a portable telephone terminal.

An explanation will be given of operation of the conventional apparatus as follows.

The moving object position detecting and transmitting apparatus 1 carries out a processing of transmitting position information of a vehicle detected by the car navigation apparatus to the information center 2 via the portable telephone base station 5 and the public network 6 by a portable telephone terminal. The information center 2 carries out a processing of grasping a tendency of the respective vehicles from the position information transmitted from the respective vehicles, predicting a traffic jam situation at respective roads and distributing the predicted traffic jam situation to the in-vehicle terminal 1 of the respective vehicle as necessary. Further, the in-vehicle terminal 1 of the respective vehicle carries out a processing of displaying the traffic jam situation distributed from the information center to a driver and guiding the driver with regard to a required time period or the shortest path to a destination by utilizing the traffic jam situation.

As described above, according to the conventional apparatus, in the system of utilizing VICS or ATIS, there poses a problem that only traffic information in a monitoring area with cameras or sensors on roads can be obtained.

Further, according to the constitution of the publication, there poses a problem that expense is needed in utilizing traffic information although the position information for forming the traffic information is provided.

Further, the traffic information is updated only at intervals of about five minutes through several tens of minutes and therefore, the traffic information obtained by a driver is not real time information but differs from a traffic situation in which the vehicle is actually running.

The invention has been carried out in order to resolve the above-described problems and it is an object thereof to provide a traffic information collecting and distributing system capable of providing traffic information in a wide range and imposing proper charge in accordance with respective traffic information user.

Further, it is an object thereof to provide a traffic information transmitting system capable of reducing a frequency of transmitting information of a current position of a moving object.

Further, it is an object thereof to provide a traffic information transmitting system capable of transmitting not only information of a current position of a moving object but also information of the moving object.

Further, it is an object thereof to provide a traffic information collecting and distributing method capable of providing traffic information over a area and imposing a proper charge on a respective traffic information user for the information.

SUMMARY OF THE INVENTION

According to an aspect of the invention, there is provided a traffic information detecting and distributing system comprising receiving means for receiving current position information transmitted from a traffic information transmitting system for detecting and transmitting the current position information of a moving object, traffic information forming means for forming traffic information based on the current position information received by the receiving means, traffic information distributing means for distributing the formed traffic information to a traffic information user, user identifying means for identifying the traffic information user based on traffic information user identifying means,and charging means for charging money to the traffic information user based on the traffic information user identifying information.

Further, according to another aspect of the invention, there is provided the traffic information collecting and distributing system wherein the receiving means successively receives the current position information transmitted from the traffic information transmitting system.

Further, according to another aspect of the invention, there is provided the traffic information collecting and distributing system wherein the traffic information transmitting system identifying information transmitted from the traffic information transmitting system is received and charge is changed based thereon.

Further, according to another aspect of the invention, there is provided the traffic information collecting and distributing system wherein the traffic information transmitting system identifying information relates to product information of the traffic information transmitting system.

Further, according to another aspect of the invention, there is provided the traffic information collecting and distributing system wherein the traffic information transmitting system identifying information relates to presence or absence of providing the current position information.

Further, according to another aspect of the invention, there is provided the traffic information collecting and distributing system wherein the charging means controls a quality or an amount of traffic information distributed by the traffic information distributing means for respective traffic information user and charges money in accordance with the quality or the amount.

Further, according to another aspect of the invention, there is provided the traffic information collecting and distributing system wherein the traffic information distributing means adds additional information to the traffic information formed by the traffic information forming means and distributes the additional information to the traffic information user and the charging means changes charge in accordance with the additional information.

Further, according to another aspect of the invention, there is provided the traffic information collecting and distributing system wherein the additional information is advertisement information and the charging means charges to a provider of the advertisement information.

Further, according to another aspect of the invention, there is provided the traffic information collecting and distributing system wherein the receiving means receives accumulated current position information at every predetermined period.

Further, according to another aspect of the invention, there is provided a traffic information transmitting system comprising position detecting means for detecting a current position of a moving object, and transmitting means for transmitting current position information of the moving object detected by the position detecting means, wherein the transmitting means transmits the current position information only under a specific condition or increases a frequency of transmitting the current position information under the specific condition.

Further, according to another aspect of the invention, there is provided a traffic information transmitting system comprising position detecting means for detecting a current position of a moving object, accumulating means for accumulating the detected current position information, and transmitting means for transmitting the accumulated current position information at every predetermined period.

Further, according to another aspect of the invention, there is provided a traffic information transmitting system comprising position detecting means for detecting a current position of a moving object, monitoring means for collecting moving object information of the moving object per se or a periphery thereof, and transmitting means for transmitting the current position information of the moving object detected by the position detecting means and the moving object information collected by the monitoring means.

Further, according to another aspect of the invention, there is provided a method of collecting and distributing traffic information comprising the steps of receiving current position information of a moving object, forming traffic information based on the received current position information, distributing the formed traffic information to a traffic information user, identifying the traffic information user based on traffic information user identifying information, and charging to the traffic information user based on the traffic information user identifying information.

BRIEF DESCRIPTION OF THE DRAWINGS

FIG. 4 shows an example of traffic information according to Embodiment 1 of the invention;

FIG. 5 shows an example of moving object map information according to Embodiment 1 of the invention;

FIG. 7 shows an example of charge information according to Embodiment 1 of the invention;

DETAILED DESCRIPTION OF THE PREFFERED EMBODIMENT

Embodiment 1

Figure 1:
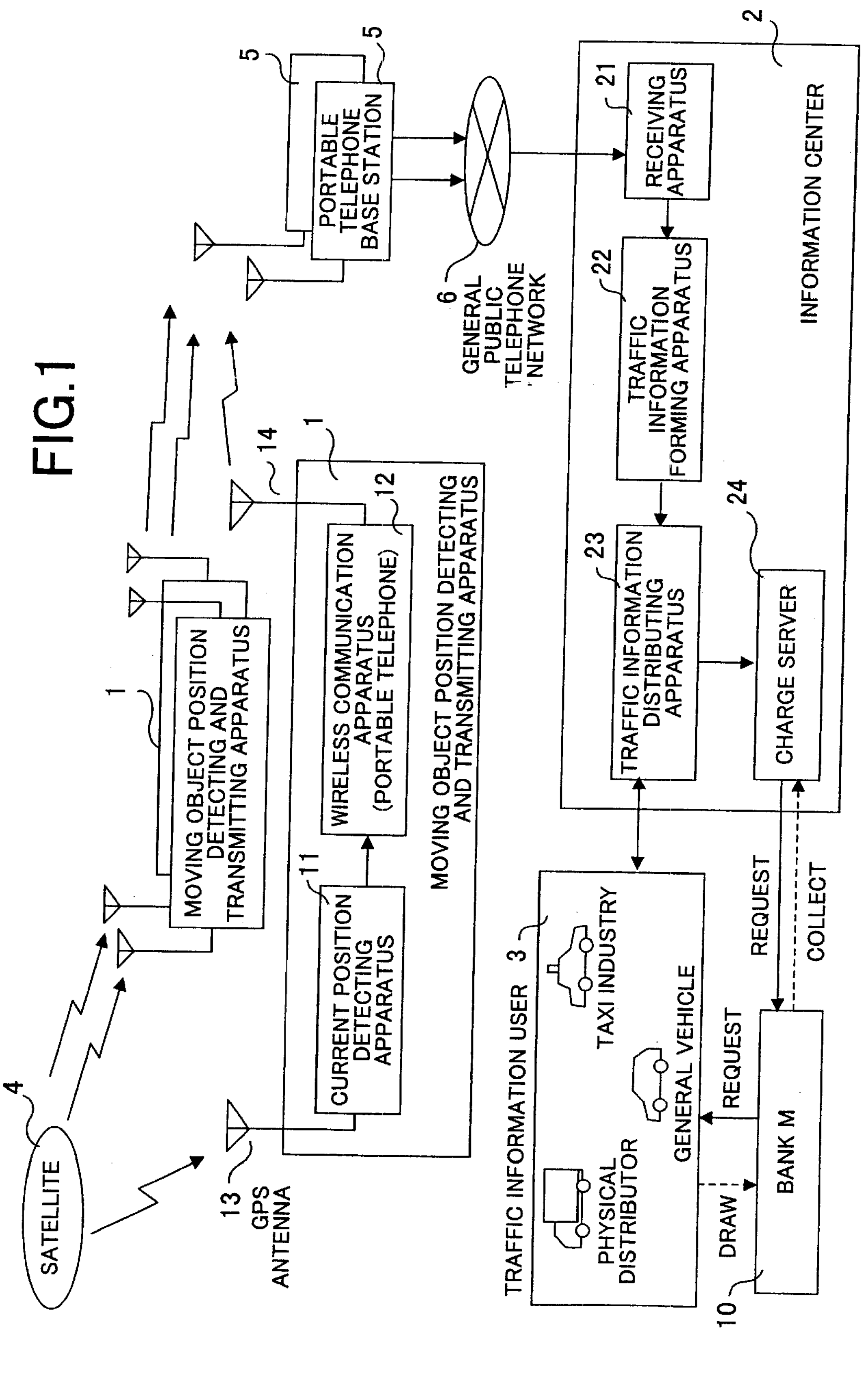
FIG. 1 is a system constitution diagram of a traffic information collecting and distributing system according to Embodiment 1 of the invention.

An explanation will be given of Embodiment 1 of the invention in reference to the drawings as follows. In FIG. 1, numeral 1 designates a moving object position detecting and transmitting apparatus as a traffic information transmitting system, numeral 2 designates an information center as a traffic information collecting and distributing system, numeral 3 designates a traffic information user, numeral 4 designates a GPS satellite, numeral 5 designates a portable telephone base station, numeral 6 designates a general public telephone network and numeral 10 designates a bank.

The moving object position detecting and transmitting apparatus 1 is constituted by a current position detecting apparatus 11 as position detecting means, a wireless communication apparatus 12, a GPS antenna 13 and a wireless communication antenna 14 as transmitting means. Further, the information center 2 is constituted by a receiving apparatus 21, a traffic information forming apparatus 22 as traffic information forming means, a traffic information distributing apparatus 23 as traffic information distributing means and a charge server 24 as charging means including user identifying means.

Further, in FIG. 1, an arrow mark of a bold line designates a flow of information and an arrow mark of a broken line designates a flow of money. The same goes with following diagrams.

An explanation will be given of operation of Embodiment 1 as follows.

According to the moving object position detecting and transmitting apparatus 1, the current position detecting apparatus 11 receives GPS signals transmitted from a plurality of GPS satellites on satellite orbits by the GPS antenna 13 and calculates current position information (latitude, longitude and height) of a moving object. The calculated current position information is transmitted to the information center 2 by the wireless communication apparatus 12 realized by a portable telephone or the like via the portable telephone base station 5 and the general public telephone network 6. Further, the moving object position detecting and transmitting apparatus 1 transmits the newest current position information at that time at every predetermined period (every predetermined time period, every predetermined running distance, every predetermined number of times of detecting position or the like).

At the information center 2, the current position information of the moving object transmitted from the moving object position detecting and transmitting apparatus 1 is received by the receiving apparatus 21, the traffic information forming apparatus 22 forms traffic information by a method, described later, the traffic information distributing apparatus 23 distributes traffic information to the traffic information user by a method, described later and the charge server 24 carries out a charge processing by a method, described later, in accordance with traffic information.

The bank 10 carries out a processing of charging the respective traffic information user 3 to pay charge for use in accordance with collection request of the charge server 24, collecting charge for use from the respective traffic information user 3 and delivering the collected charge for use to the charge server 24.

With regard to a method of calculating the current position information of the current position detecting apparatus 11 in the moving object position detecting and transmitting apparatus 1, as shown in a position detecting apparatus described in Japanese Patent Laid-Open No. 202065/1991 or Japanese Patent Laid-Open No. 236650/1997, the current position information can be calculated from positions and distances of the plurality of GPS satellites and therefore, a detailed explanation thereof will be omitted.

The above-described current position information is data comprising a moving object ID for identifying the respective moving object, and latitude longitude and height of the current position of the moving object.

Further, with regard to a method of transmitting the current position information of the wireless communication apparatus 12 in the moving object position detecting and transmitting apparatus 1, data communication is possible by using a portable telephone as shown in, for example, Japanese Patent Laid-Open No. 84430/1998 and therefore, a detailed explanation thereof will be omitted.

Figure 2:
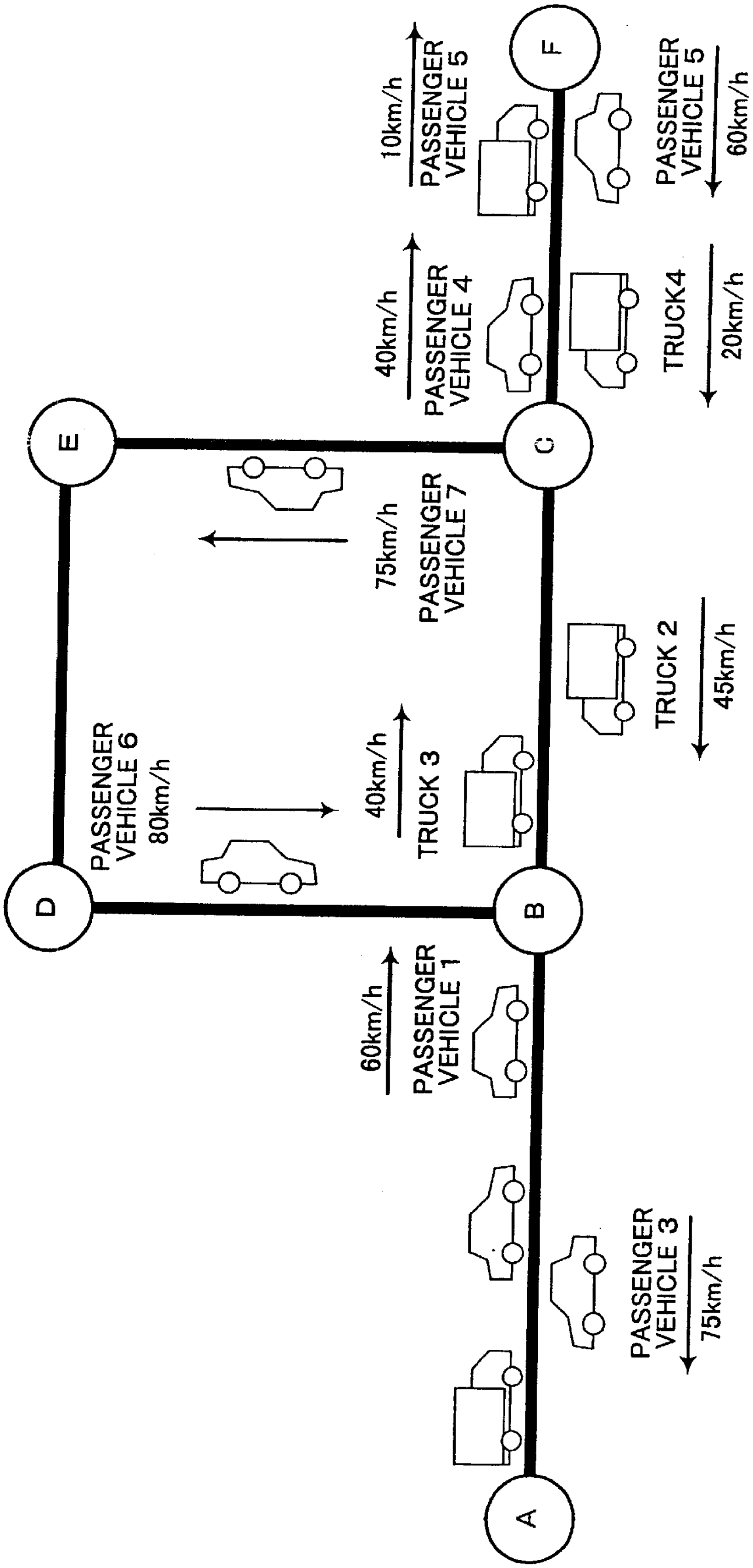
FIG. 2 is a traffic situation model diagram according to Embodiment 1 of the invention.

FIG. 2 is a traffic situation model diagram showing a model of a traffic situation according to Embodiment 1 . In this case, the traffic information is information constituted by a number of moving objects present between locations and average speeds thereof between the locations. For example, when passenger vehicle 1 runs at 60 km/h, passenger vehicle 2 runs at 70 km/h and truck 1 runs at 50 km/h in FIG. 2, according to traffic information between location A location B, as shown by 301 of FIG. 4, a number of present moving objects is 3 and the average speed is 60 km/h.

Figure 3:
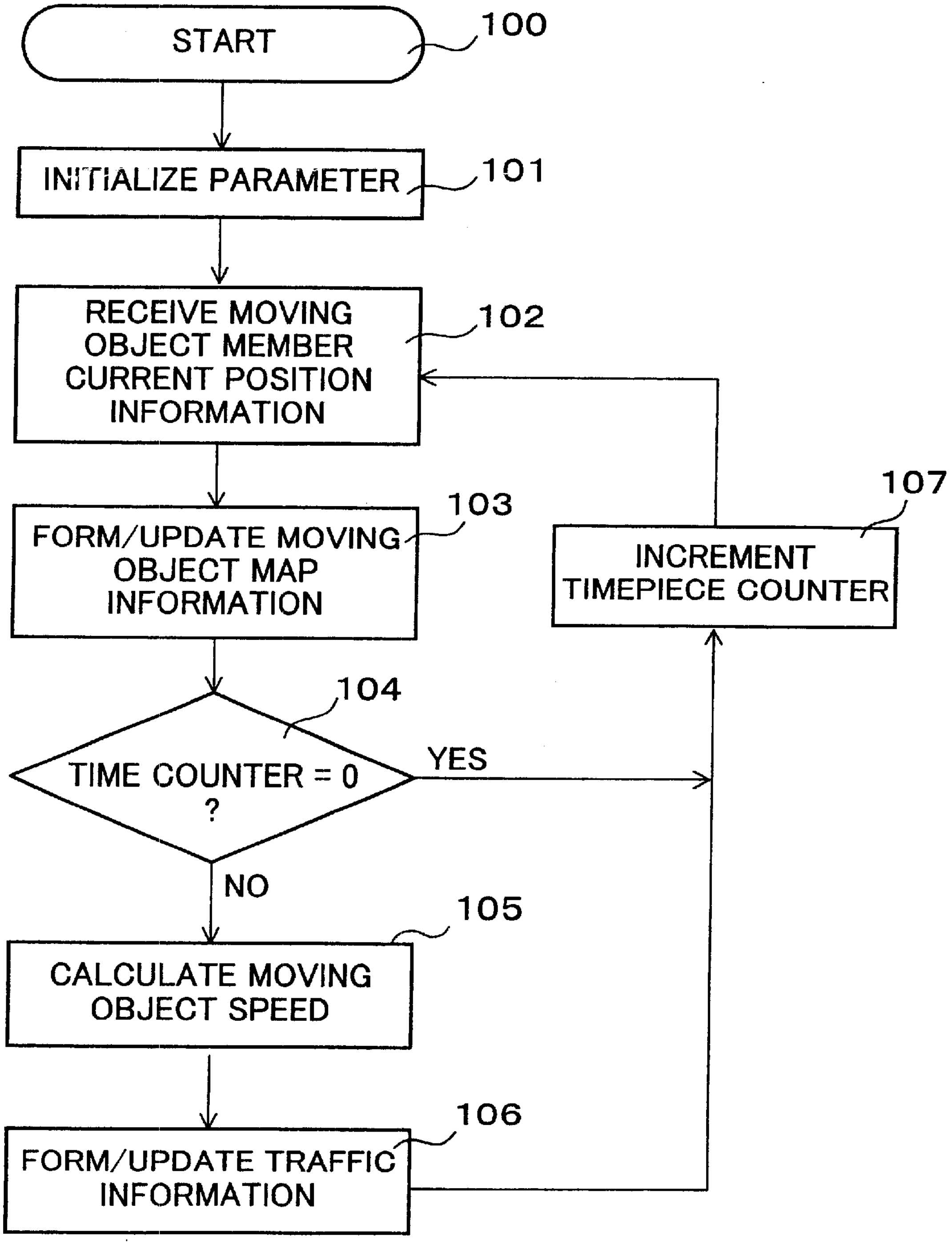
FIG. 3 is a flowchart of a processing of a traffic information forming apparatus according to Embodiment 1 of the invention.

First, an explanation will be given of a processing of forming traffic information at the traffic information forming apparatus 22 in the information center 2 in reference to a flowchart of a processing of FIG. 3.

After initializing (101) parameters (traffic information, moving object map information and timepiece counter) in the traffic information forming apparatus 22, the receiving apparatus 21 receives current position information of a moving object transmitted from the moving object position detecting and transmitting apparatus 1 (102). There is carried out a processing of forming/updating the moving object map information 302, described later, from the received current position information of the respective moving object (103). When the moving object map information is firstly formed (timepiece counter =0), the timepiece counter is incremented and the operation returns to the processing of receiving the current position information of the moving object. Otherwise, the speed of the respective moving object is calculated from a difference between the latitude, a difference between longitudes and a difference between time periods in the newest moving object map information and moving object map information at the timepiece counter prior thereto by one (105). There is carried out a processing of forming traffic information, described above, from the calculated speed of the respective moving object and the moving object map information (106), the operation returns to the processing of receiving the current position information of the moving object by incrementing the timepiece counter (102) and the processing is repeated.

The above-described moving object map information 302 is information constituted by the moving object ID and the current position (latitude, longitude) of the respective moving object and a path at which the moving object is present. For example, FIG. 5 is the moving object map information when the respective moving objects are brought into a state of FIG. 2 (at timepiece counter t).

The traffic information forming apparatus 22 controls the moving object map information at every timepiece counter by a toggle. For example, when there is provided the moving object map information at timepiece counter "t" and time counter "t+1" , there is carried out a processing of abandoning the map information at time counter "t" when moving object map information at timepiece counter "t+2" is formed.

Figure 6:
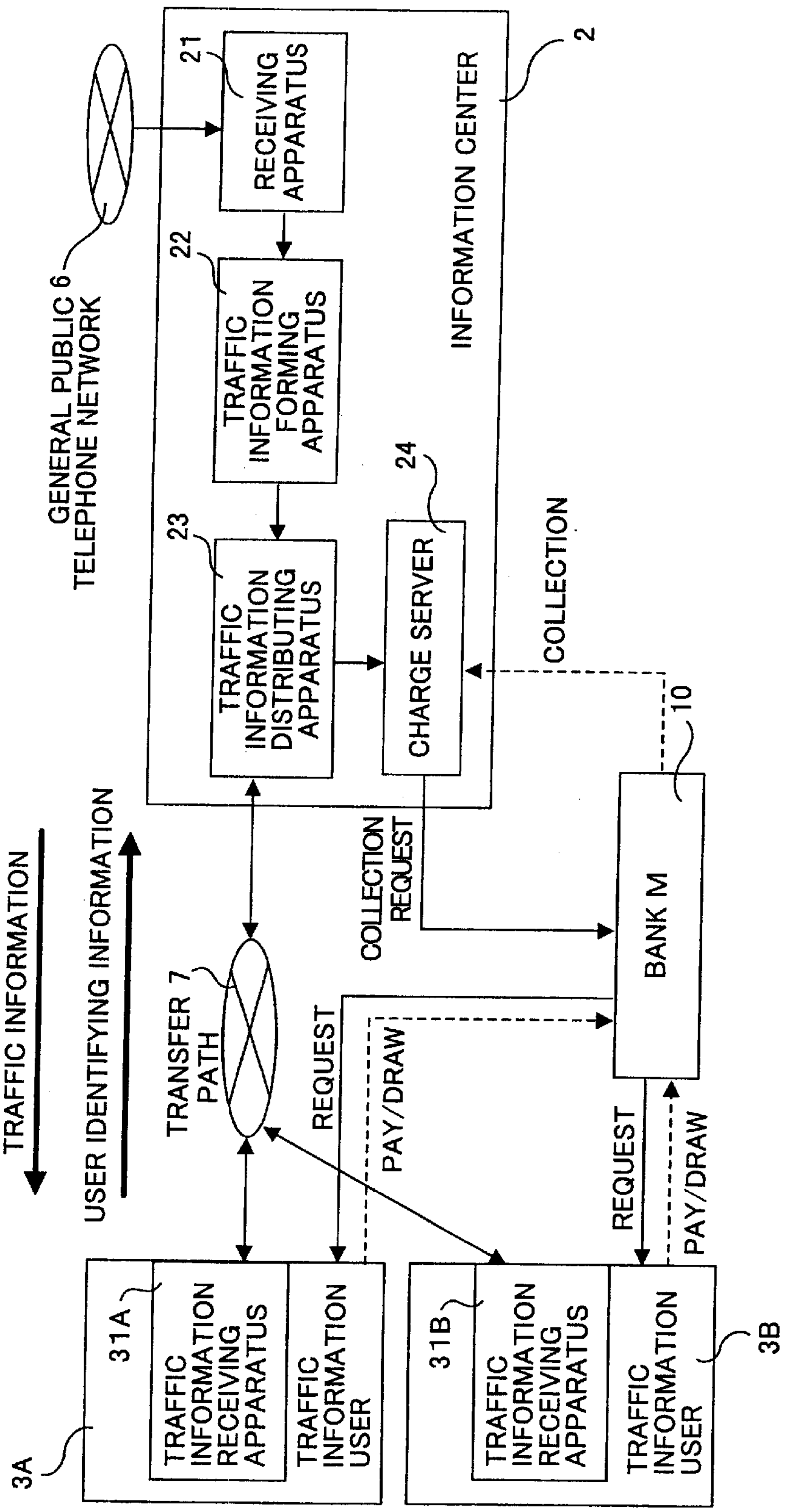
FIG. 6 is a partially detailed system constitution diagram according to Embodiment 1 of the invention.

An explanation will be given of a traffic information distributing processing of the traffic information distributing apparatus 23 in the information center 2 in reference to a partially detailed system constitution diagram of FIG. 6. In the drawing, traffic information receiving apparatus 31A and 31B in traffic information users 3A and 3B are connected to the information center 2 via a transmission path 7. The traffic information distributing apparatus 23 carries out a processing of distributing traffic information to the traffic information receiving apparatus 31 at every constant time period via the transmission path 7 and carries out a processing of transmitting the distributed traffic information user identifying information to the charge server 24 at every distribution.

In this case, the traffic information user identifying information is information for identifying the respective traffic information user, for example, traffic information user 3A or traffic information user 3B.

An explanation will be given of a charge processing of the charge server 24 in the information center 2. At the charge server 24, there is carried out a processing of counting a number of times of distribution at every traffic information user identifying information transmitted from the traffic information distributing apparatus 23 and forming/updating charge information 303 shown in FIG. 7 and issues collection request of traffic information using charge in accordance with charge information with respect to a traffic information user to the bank 10 at every constant time period.

Further, the traffic information receiving apparatus 31 carries out a processing of transmitting the traffic information user identifying information to the traffic information distributing apparatus 23 at every time of succeeding a processing of receiving traffic information distributed from the traffic information distributing apparatus 23.

Meanwhile, the traffic information user identifying information is not limited to the information based on a signal distributed from the traffic information receiving apparatus 31 but may be information generated by the traffic information distributing apparatus 23 per se. For example, in the traffic information distributing apparatus 23, there may previously be determined a frequency of distributing traffic information for respective traffic information user and traffic information user identifying information of to which traffic information user traffic information is distributed at current time, may be transmitted from the traffic information distributing apparatus 23 to the charge server 24 at every time of distributing traffic information.

As described above, according to Embodiment 1, traffic information is formed based on current position information transmitted from respective moving object and accordingly, it is not necessary to install cameras or sensors for forming traffic information. That is, traffic information can be formed even when cameras or sensors are not present and traffic information in a wide range can be formed.

Further, when current position information is transmitted at every time of detecting current position of a moving object by the current position detecting means, traffic information of real time can be provided.

Further, the traffic information distributing apparatus 23 at the information center 2 charges money based on the traffic information user identifying information and therefore, money can be charged properly to the respective traffic information user.

Further, although according to Embodiment 1, the traffic information distributing apparatus 23 distributes traffic information at every constant time period, a request for distribution may be issued when the traffic information user 3 needs traffic information and the traffic information distributing apparatus 23 may distribute traffic information in accordance with the distribution request.

Further, although according to Embodiment 1, there is described a method of detecting by using GPS as an example of the position detecting method of the current position detecting apparatus 11, there may be used a position detecting method such as a position detecting function of PHS (Personal Handy phone System).

Further, although according to Embodiment 1, a portable telephone is used as an example of the wireless communication apparatus 12 as transmitting means, transmission may be carried out to the information center by using communicating means such as DSRC (Dedicated Short Range Communications).

Further, although according to Embodiment 1, the charge server 24 charges money in accordance with a number of times of distributing traffic information to the traffic information user 3, the traffic information distributing apparatus 23 may transmit time of starting to distribute traffic information and time of finishing to distribute thereof, the charge server 24 may calculate a distribution time period by measuring the time of starting to distribute and the time of finishing to distribute traffic information and charges money to the traffic information user in accordance with the distribution time period.

Further, although according to Embodiment 1, the traffic information forming apparatus 22 controls the moving object map information by the toggle, the information may be controlled by three or more of ring buffers.

Further, although according to Embodiment 1, a transmission path of transmitting traffic information from the information center 2 to the traffic information user 3, is separate from a transmission path of the general public telephone network of transmitting the moving object position information from the moving object position information detecting and transmitting apparatus 1 to the information center 2, traffic information may be distributed via the general public telephone network and/or the portable telephone base station.

Further, although the moving object position detecting and transmitting apparatus 1 and the traffic information receiving apparatus 31 are dealt with as separate apparatus, these may be dealt with as a single apparatus.

Further, although according to Embodiment 1, the information center 2 and the traffic information user 3 are connected via the transmission path, it is not necessary that these are connected with each other but traffic information formed by the information center 2 may be distributed to the traffic information user 3 by using a record medium such as a paper medium of file or report.

Further, although according to Embodiment 1, the charge server 24 collects charge for use from the traffic information user 3 via the bank 10, the charge for use may be collected directly from the user.

Embodiment 2

According to Embodiment 1, when the charge server 24 carries out the processing of charging money to the traffic information user 3, money is charged similarly to the respective traffic information user in accordance with a number of times of charge or a time period of charge and when the number of times of charge or the time period of charge stays the same, the same money is charged to the respective traffic information user. In contrast thereto, according to Embodiment 2, even when the number of times of charge or the time period of charge stays the same, a specific traffic information user is made free of charge or charged more inexpensively than other traffic information user.

Figure 8:
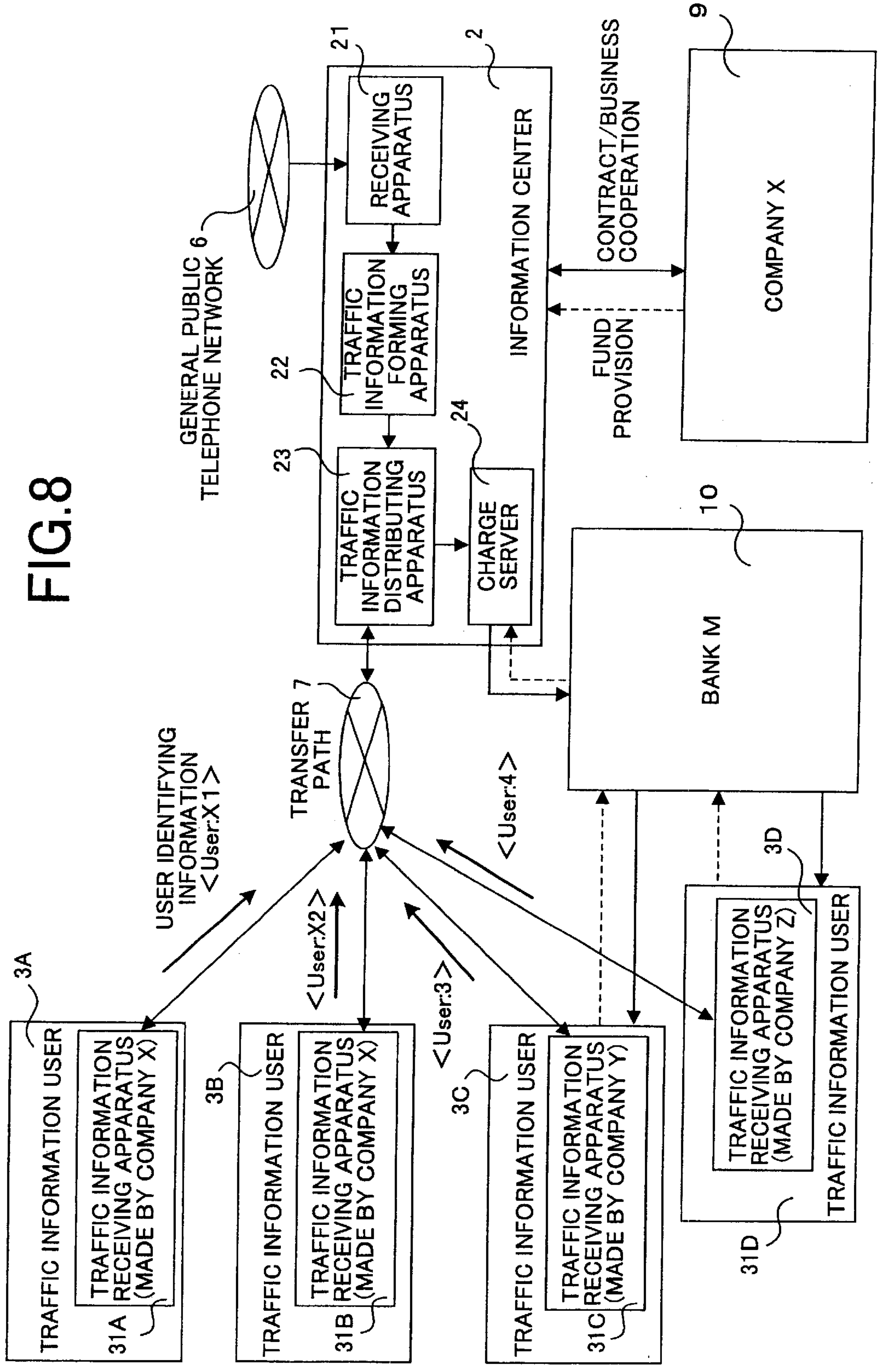
FIG. 8 is a partially detailed system constitution diagram according to Embodiment 2 of the invention.

FIG. 8 shows a partially detailed system constitution diagram of Embodiment 2. In the drawing, traffic information users A and B are traffic information users using apparatus of a product by company X as traffic information receiving apparatus 31A and 31B. Traffic information user C is a traffic information user using traffic information receiving apparatus 31C of a product by company Y. Traffic information user D is a traffic information user using traffic information receiving apparatus 31D made by company Z.

Further, according to the example of Embodiment 2, the information center 2 constituting a traffic information provider, is in business cooperation with company X 9 and the information center 2 is provided with fund from company X 9.

Next, an explanation will be given of processings of the traffic information receiving apparatus 31A and 31B of products by company X owned by the traffic information users 3A and 3B. In transmitting the traffic information user identifying information, the traffic information receiving apparatus 31A and 31B of products by company X, carry out a processing of transmitting to add product information indicating the product made by company X as traffic information transmitting system identifying information in addition to the traffic information user identifying information normally transmitted. For example, when traffic information user identifying information of a traffic information user A is a user 1, there is carried out a processing of transmitting the traffic information user identifying information as user X1. The traffic information distributing apparatus 23 receives the user X1 as the traffic information user identifying information and transmits thereof to the charge server 24.

Figure 9:
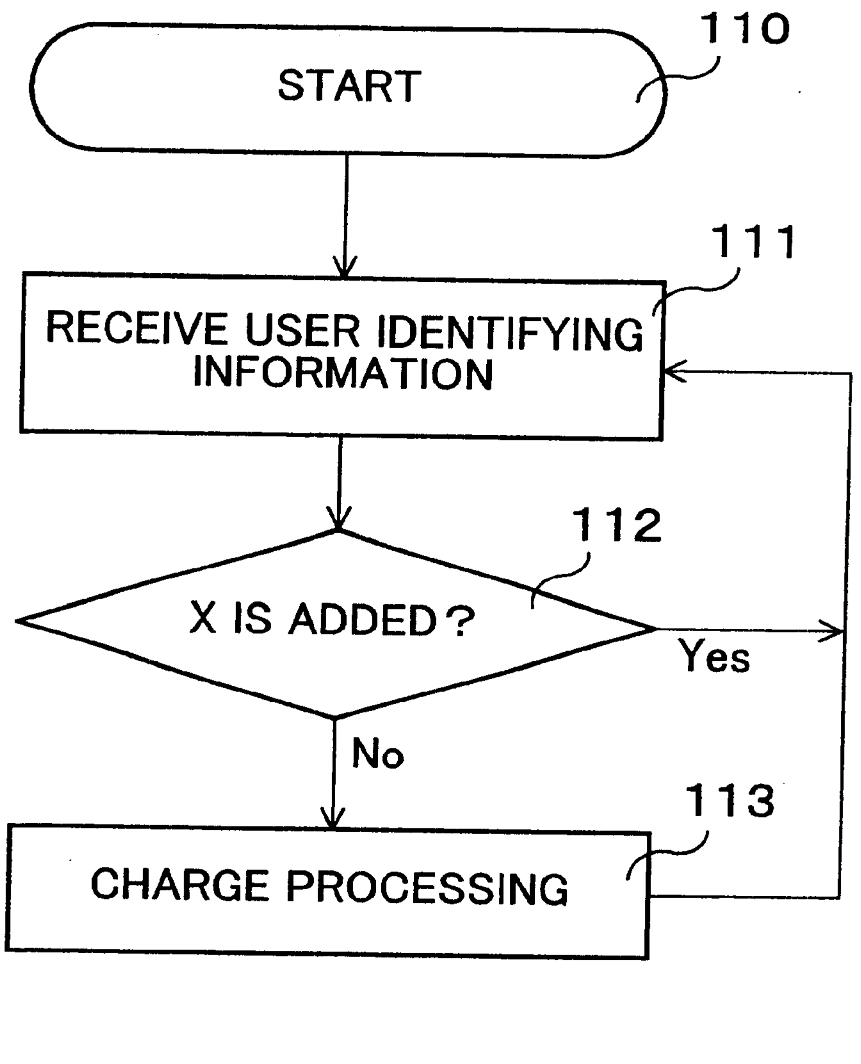
FIG. 9 is a flowchart of a charge processing of a charge server according to Embodiment 2 of the invention.

An explanation will be given of a charge processing of the charge server 24 in the information center 2 in reference to a flowchart of a processing of FIG. 9. First, the charge server 24 receives the traffic information user identifying information transmitted from the traffic information distributing apparatus 23 (111). Next, the operation determines whether the received traffic information user identifying information is added with information of a product by company X (112). When the information is not added, there is carried out a charge processing the same as that of the charge server according to Embodiment 1 (113), thereafter, the operation returns to the processing of receiving the traffic information user identifying information (111). In contrast thereto, when the information is added, the charge processing is not carried out and the operation returns to the processing of receiving the traffic information user identifying information (111).

As described above, according to Embodiment 2, the charge server 24 does not charge money when the traffic information user identifying information includes product information of company X and therefore, a traffic information user having the traffic information receiving apparatus of company X can use traffic information free of charge.

Further, the information center 2 constituting the traffic information provider can be provided with fund from company X 9. Further, company X 9 can expedite sale of the product of its own company by making business cooperation with and providing fund to the information center 2.

Further, although according to Embodiment 2, the charge server 24 does not charge money to the traffic information user identifying information having the product information of company X, the charge server 24 can charge money thereto at a rate lower than that of traffic information user identifying information which is not provided with the product information of company X. For example, in carrying out a charge processing the same as that of Embodiment 1, by multiplying a number of times of distributing the traffic information user identifying information having the product information of company X by 1/2, the traffic information user 3 having the traffic information receiving apparatus of company X can use traffic information at the rate half as that of other user.

Further, although according to Embodiment 2, the information center is in business cooperation with only company X, the business cooperation may be carried out with a plurality of companies, for example, company Y and company Z. Further, a discount rate may be changed for respective companies with regard to the traffic information user identifying information having product information of respective companies.

Embodiment 3

Figure 10:
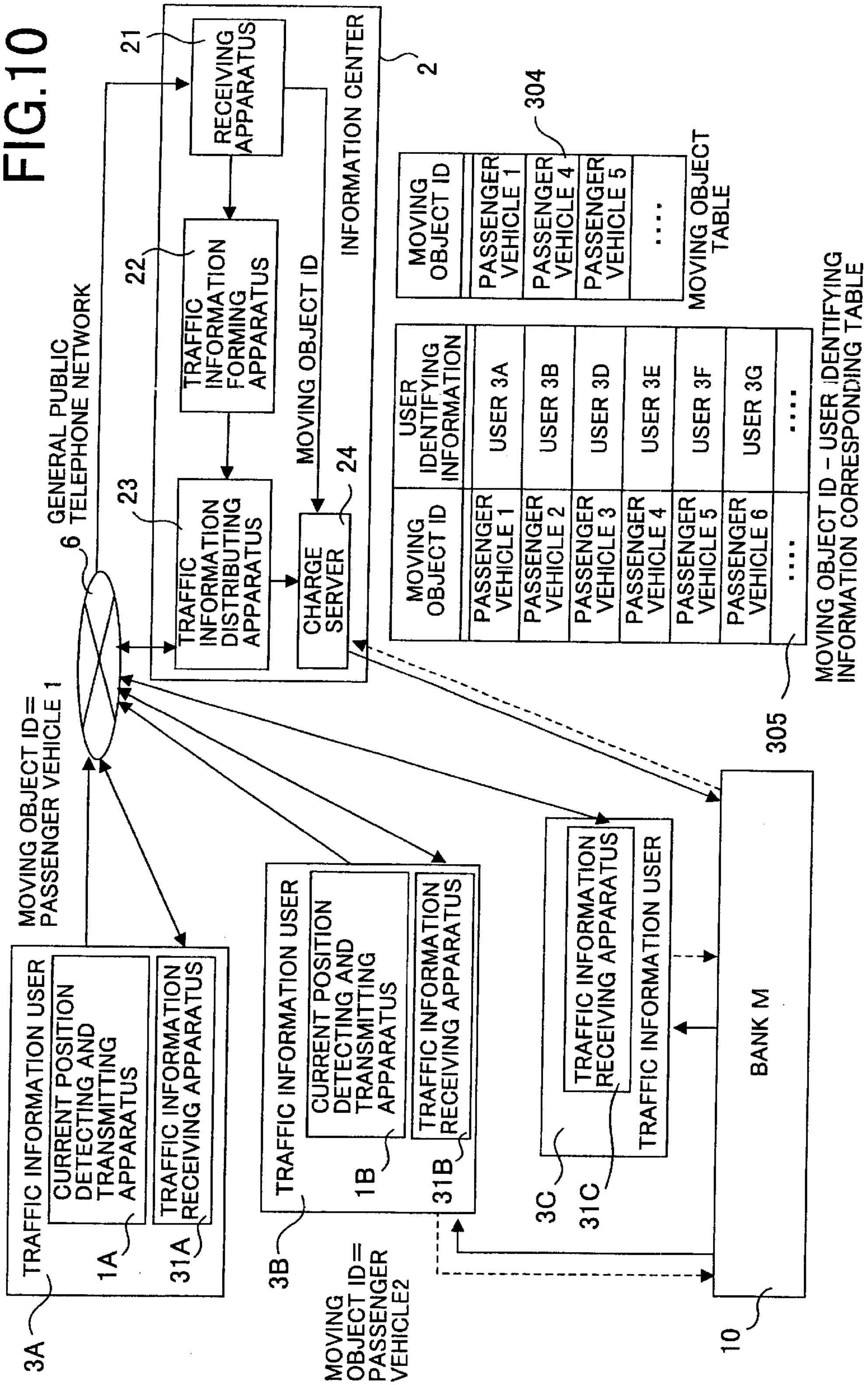
FIG. 10 is a partially detailed system constitution diagram according to Embodiment 3 of the invention.

According to Embodiment 2, the traffic information user having the specific traffic information receiving apparatus is not charged or charged at a lower rate. In contrast thereto, according to Embodiment 3 , when a traffic information user is a position information transmitter for transmitting current position information, the traffic information user is not charged or charged at a lower rate. FIG. 10 is a partially detailed system constitution diagram of Embodiment 3.

In the drawing, the traffic information user 3A is provided with a current position detecting and transmitting means 1A of a moving object and is a user who has transmitted current position information of one's own to the information center 2. Meanwhile, although the traffic information user 3B is provided with current position detecting and transmitting means 1B of a moving object, the traffic information user 3B is a user who has not transmitted position information to the information center 2. Further, the traffic information user 3C is a traffic information user who only uses traffic information distributed from the information center 2.

An explanation will be given of the operation as follows.

In FIG. 10, the receiving apparatus 21 in the information center 2 carries out a processing of transmitting received current position information of a moving object to the traffic information forming apparatus 22 and sampling moving object ID (moving object identifying information) included in the current position information and transmitting thereof to the charge server 24. The charge server 24 carries out a processing of accumulating the transmitted moving object ID by a method, described later, and simultaneously therewith, carries out a processing of comparing the moving object ID accumulated by the method, described later, and traffic information user identifying information, not charging money when the comparison is succeeded and charging money only when the comparison is failed.

Figure 11:
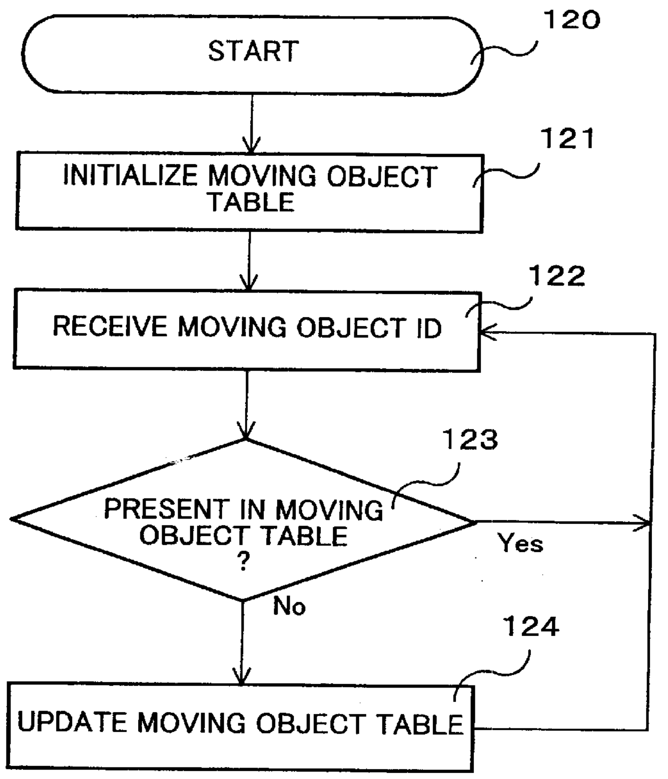
FIG. 11 is a flowchart of a processing of accumulating a moving object's ID of a charge server according to Embodiment 3 of the invention.

An explanation will be given of a method of accumulating the moving object ID of the charge server 24 in reference to a flowchart of FIG. 11. In this case, a moving object ID table 304 illustrated in FIG. 10 is list information accumulated with moving object IDs transmitted in the past.

First, all of the list information is erased as initializing of the moving object ID table 304 (121). Next, there is carried out a processing of receiving a moving object ID transmitted from the receiving apparatus 21 (122). It is determined whether the received moving object ID is present in the moving object ID table 304 and when not present, the transmitted moving object ID is added to the moving object table (124). Conversely, when present, the operation returns to the processing of receiving a moving object ID (122) without updating the moving object table. That is, for example, when as in the traffic information user 3A, the moving object ID has been transmitted along with the current position information of the traffic information user 3A even once, the moving object ID of the traffic information user 3A is stored to the moving object ID table 304.

Figure 12:
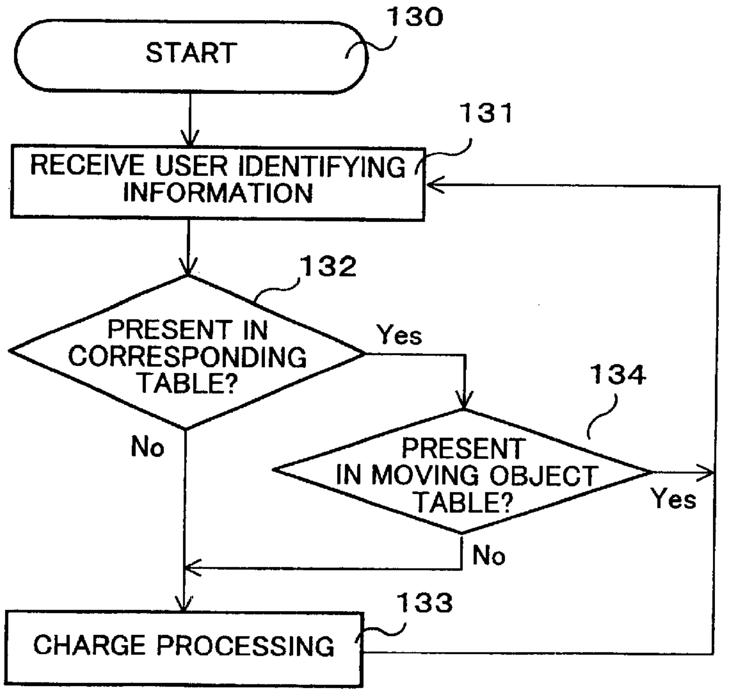
FIG. 12 is a flowchart of a processing of comparing a user of the charge server according to Embodiment 3 of the invention.

An explanation will be given of a processing of comparing the moving object ID table 304 provided as described above, and the traffic information user identifying information provided to the charge server 24 and the charge processing in reference to a flowchart of FIG. 12. In this case, a moving object ID-traffic information user identifying information corresponding table 305 shown in FIG. 10 is a table for corresponding to determine what moving object ID of a moving object is provided to the traffic information user 3 and is formed by registering the moving object ID of the user to the information center 2 when the traffic information user 3 purchases the traffic information receiving apparatus 31.

First, the traffic information user identifying information transmitted from the traffic information distributing apparatus 23 is received (131) and there is carried out a comparison of whether the transmitted traffic information user identifying information is present in the moving object ID-traffic information user identifying information corresponding table 305 (132). When not present, the user is determined to be the traffic information user 3C and there is carried out a charge processing the same as that of Embodiment 1 (133). Conversely, when the transmitted traffic information user identifying information is present in the moving object ID-traffic information user identifying information corresponding table 305, it is determined whether the moving object ID in correspondence with the traffic information user identifying information is present in the moving object ID table 304 (134). When not present in the moving object ID table 304, the traffic information user is a user who has not transmitted the moving object ID even once and therefore, it can be determined that the user is the traffic information user 3B and there is carried out the charge processing the same as that in Embodiment 1 (133). Conversely, when the moving object ID in correspondence with the traffic information user identifying information is present in the moving object ID table 304, the traffic information user is a person who has transmitted the moving object ID along with the current position information and therefore, can be determined as the traffic information user 3A and in this case, the charge processing is not carried out and the operation return to the processing of receiving the traffic information user identifying information (131).

As a result, among the traffic information users 3A, 3B and 3C in FIG. 10, by carrying out the above-described charge processing, the charge processing the same as that in Embodiment 1, is carried out for the traffic information users 3B and 3C and the charge processing is not carried out for the traffic information user 3A.

As described above, according to Embodiment 3, the charge server compares the position information transmitter who has transmitted the current position information, with the traffic information user, the charge processing is carried out in accordance with a result of the comparison and therefore, the traffic information user 3A who has transmitted traffic information of one's own can utilize traffic information free of charge as a recompense for transmitting the information. Further, by the above-described service, providers of the current position information are increased and therefore, the information center 2 which is the provider of traffic information can obtain current position information of a larger number of the moving objects and can form traffic information having higher accuracy.

Further, although according to Embodiment 3, the traffic information user 3A is not charged, the traffic information user 3A may be charged at a rate lower than that of the traffic information users 3B and 3C.

Further, although all of information which has been transmitted in the past is accumulated as the processing of accumulating the moving object IDs in the charge server 24, only a traffic information user who transmits position information within a certain period of time may constitute an object of service by constituting list information of recording newest transmission time as the moving object ID table and erasing the moving object ID after passing the newest transmission time in a constant time period.

Embodiment 4

Although according to the above-described embodiments, all of traffic information formed by the traffic information forming apparatus 22 is distributed by the traffic information distributing apparatus 23, according to Embodiment 4, formed traffic information is partially distributed. An explanation will be given of a distributing processing of the traffic information distributing apparatus 23 according to Embodiment 4 in reference to a flowchart of a processing of FIG. 13.

Figures 13, 14, 15:
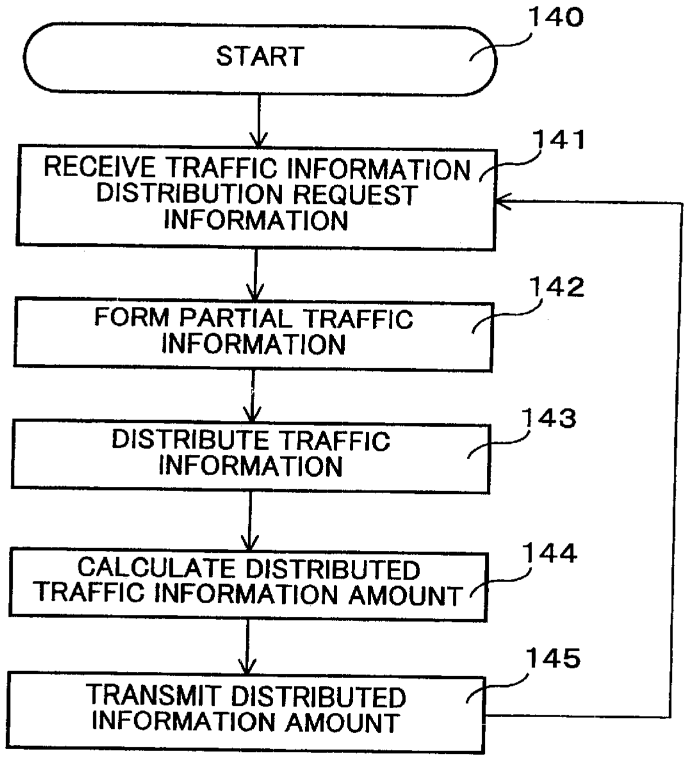
FIG. 13 is a flowchart of a processing of a traffic information distributing apparatus according to Embodiment 4 of the invention.
Fig. 14 shows an example of partial traffic information according to Embodiment 4 of the invention.
FIG. 15 shows an example of distributed traffic information amount data according to Embodiment 4 of the invention.

First, the traffic information distributing apparatus 23 receives a distribution request transmitted from the traffic information receiving apparatus 31 of the traffic information user 3 (141). In this case, the distribution request specifies a necessary portion of the traffic information user 3 and is, for example, information such as "traffic information in roads of A→B and B→A". The traffic information distributing apparatus 23 forms partial traffic information by cutting out a portion of traffic information based on the received traffic information distribution request (142). In this case, the partial traffic information is, for example, partial traffic information 306 with regard to an interval A–B (road of AB, BRA) as shown by FIG. 14. Next, the traffic information distributing apparatus 23 partially distributes traffic information formed by a method the same as that of Embodiment 1 and obtains traffic information user identifying information (143), thereafter, calculates an amount of distributed traffic information by a method, described later (144), carries out a processing of transmitting distributed traffic information amount data as a result of calculation to the charge server (145) and the operation returns to the processing of receiving the traffic information distribution request.

In this case, distributed traffic information amount data 307 indicates an amount of traffic information with regard to traffic information user identifying information as shown in FIG. 15.

An explanation will be given of the processing of calculating the distributed traffic information amount (144) in the traffic information distributing apparatus 23 by using an example. For example, as a unit of the information amount, an information amount with regard to one path (for example, road of AB) is set to 1, the traffic information amount can be calculated based on the distribution request. For example, when the traffic information user 3 receives traffic information as shown by FIG. 14, the information amount becomes 2.

An explanation will be given of a processing of the charge server 24 according to Embodiment 4 mentioned above. There is carried out a processing of receiving the distributed traffic information amount data 307 measured by the traffic information distributing apparatus 23, counting a traffic information amount for respective traffic information user identifying information and charging to a traffic information user based on the traffic information amount at a certain time point.

As described above, according to Embodiment 4, the traffic information distributing apparatus 23 distributes a portion of traffic information and measures an amount of distributed traffic information, the charge server 24 charges money in accordance with the measured amount of the distributed traffic information and therefore, the traffic information user 3 can obtain only necessary traffic information and can reduce communication expense necessary for obtaining the traffic information.

Figure 16:
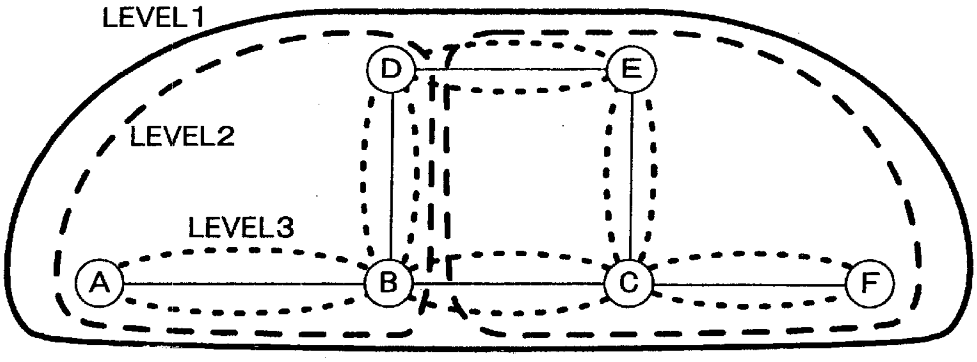
FIG. 16 shows an example of partial traffic information according to Embodiment 4 of the invention.

Further, although according to Embodiment 4, as partial traffic information, there is constituted traffic information for respective road, there may be constituted a traffic information level as shown by FIG. 16, that is, partial traffic information in accordance with quality. In FIG. 16, traffic information of level 1 is a number and average speed of moving objects in all of areas A→F. Traffic information at level 2 is traffic information combined with traffic information in an area of A–B–D and traffic information in an area of B→F. Traffic information at level 3 is combined with traffic information of respective roads. In this case, traffic information at level 3 is dense information having larger information amount and conversely, traffic information at level 1 is coarse information having smaller information amount. With regard to the levels of the traffic information, the traffic information user requests traffic information at necessary level and the information center distributes traffic information in accordance therewith by which the traffic information user can obtain traffic information having necessary quality. In this case, as a method of calculating the traffic information amount, for example, when it is prescribed that traffic information amount at level 1 is set to 1, traffic information amount at level 2 is set to information amount 2 and traffic information amount at level 3 is se to 3, the distributed traffic information amount can be calculated. That is, money can be charged in accordance with the quality of the traffic information.

Further, in Embodiment 4, when the traffic information user specifies partial traffic information, the traffic information user may change partial traffic information dynamically and provide thereof to the traffic information receiving apparatus 31.

Embodiment 5

Figure 17:
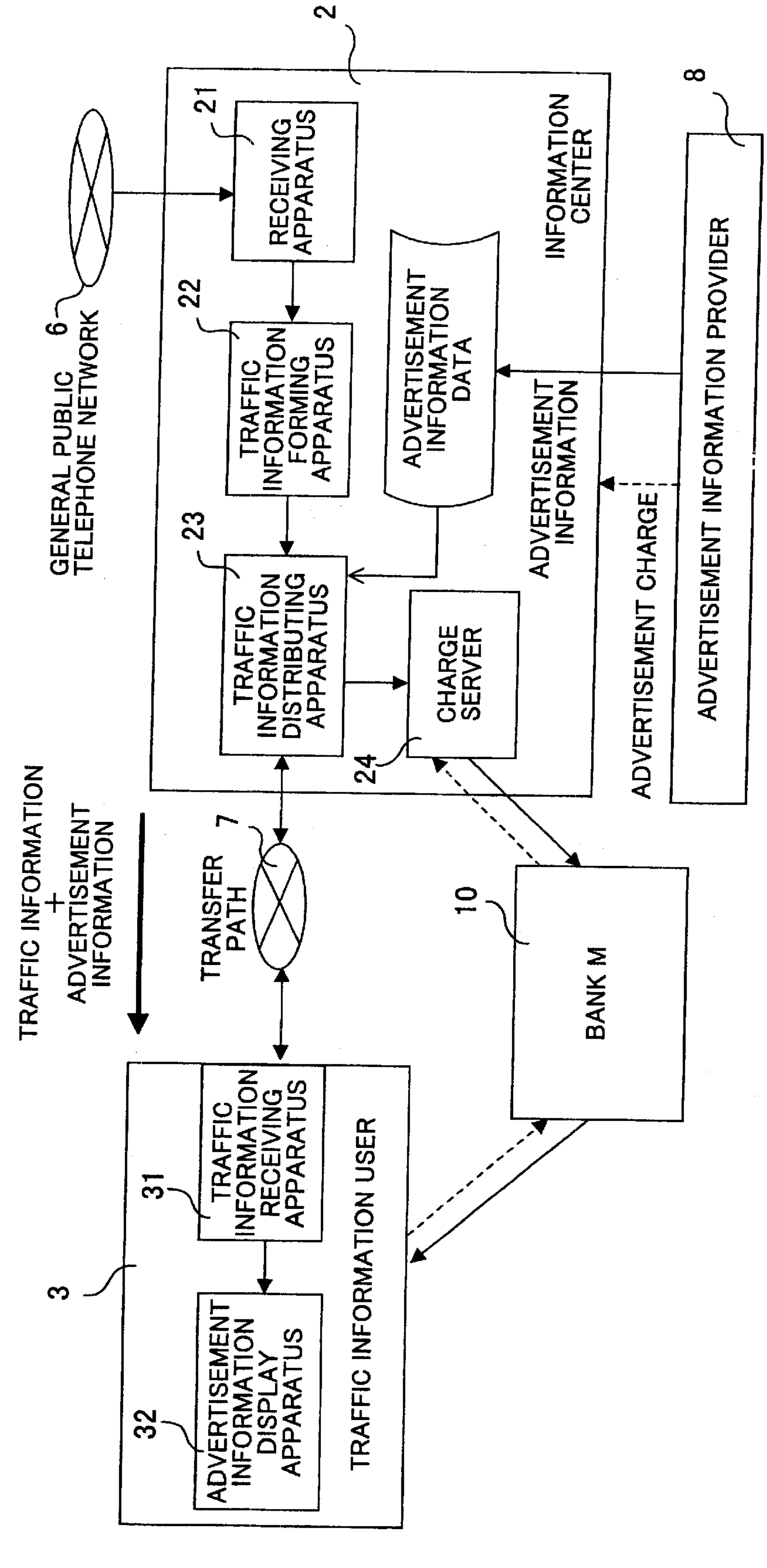
FIG. 17 is a partially detailed system constitution diagram according to Embodiment 5 of the invention.

Although in the above-described embodiments, information is constituted only by traffic information formed as information distributed to the traffic information user 3, according to Embodiment 5, the information center obtains additional information from an additional information provider and distributes the additional information along with traffic information. FIG. 17 shows a partially detailed system constitution according to Embodiment 5. In FIG. 17, numeral 8 designates an advertisement information provider for providing advertisement information as additional information. Further, the advertisement information provider 8 pays advertisement charge to the information center 2 in accordance with advertisement information distributed by the information center 2.

An explanation will be given of the operation as follows.

In FIG. 17, the traffic information distributing apparatus 23 in the information center 2 carries out a processing of distributing advertisement information in accordance with traffic information distributed by a method, described later, and a traffic information receiving apparatus 31 carries out a processing of separating traffic information and advertisement information from distributed information and providing the advertisement information to the user via a advertisement display apparatus 32.

Figure 18:
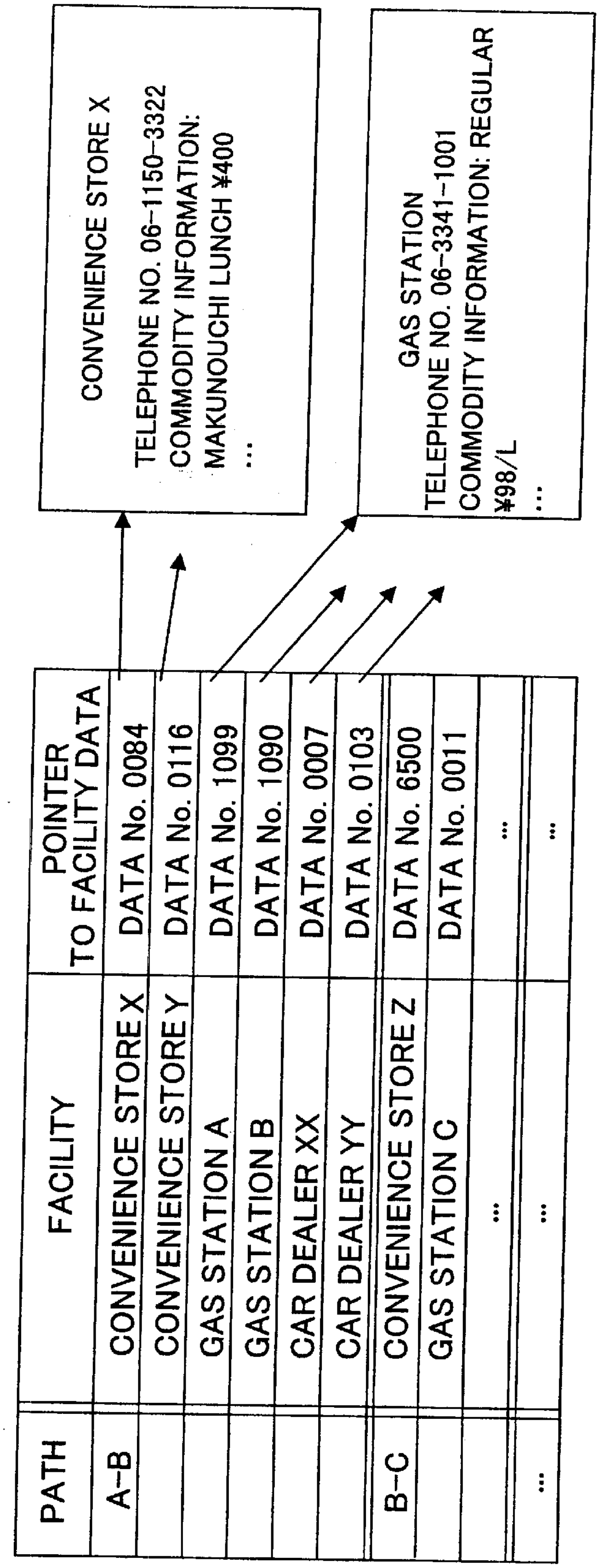
FIG. 18 shows an example of advertisement information according to Embodiment 5 of the invention.

In this case, advertisement information is information with regard to facilities present at vicinities along roads and accumulated in a form corresponding respective roads with respective facilities in the information center as shown by FIG. 18. According to the accumulating method, for example, it can easily be searched that there is advertisement information of a convenience store X, a gas station A and the like as facilities of a road A–B.

Figure 19:
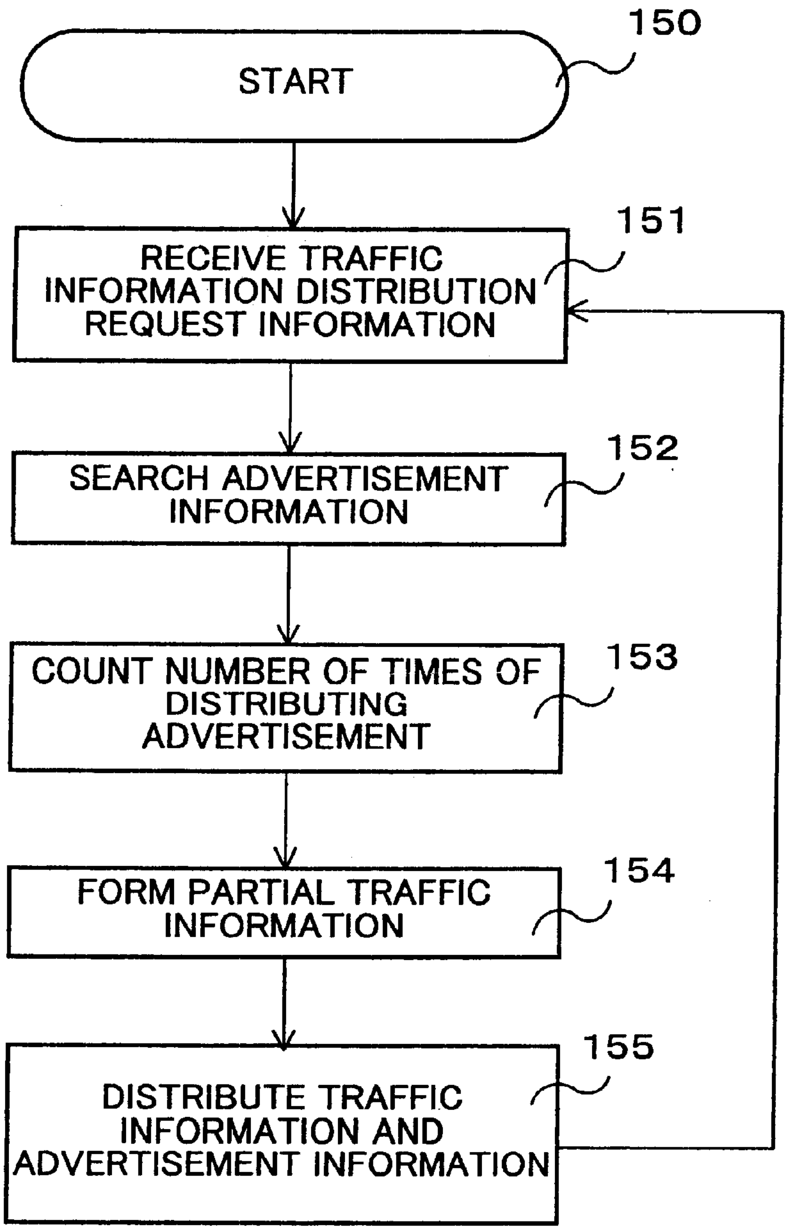
FIG. 19 is a flowchart of a processing of a traffic information distributing apparatus according to Embodiment 5 of the invention.

An explanation will be given of a processing of distributing traffic information of the traffic information distributing apparatus 23 in reference to a flowchart of a processing of FIG. 19. First, a distribution request from the traffic information user 3 is received (151), advertisement information in correspondence with the distribution request is searched (152) and advertisement information coinciding with a search condition is counted for respective facility to thereby form data of a number of times of distributing advertisement (153). Further, the traffic information distributing apparatus forms partial traffic information in accordance with the distribution request (154), there is carried out a processing of distributing the formed partial traffic information along with the advertisement information coinciding with the search condition to the traffic information user (155) and the operation returns to the processing of receiving the distribution request (151).

Further, the data of a number of times of distributing advertisement formed by the processing of counting the number of times of distributing advertisement (154) is used in calculating advertisement charge to be collected from the advertisement information provider.

As described above, according to Embodiment 5, the information center 2 provides the advertisement information provided by the advertisement information provider 8 along with the traffic information to the traffic information user 3, the information center 2 collects the advertisement charge in accordance with the number of times of distributing advertisement from the advertisement information provider 8 and accordingly, the information center 2 constituting the traffic information provider can receive advertisement income other than the charge of utilizing traffic information. The information center 2 can be provided with income other than the charge for using traffic information and accordingly, the charge of utilizing traffic information can be reduced in accordance therewith and the traffic information user 3 can use traffic information by inexpensive charge for use.

Further, although according to Embodiment 5, the charge of utilizing traffic information of the traffic information user is reduced by collecting the advertisement charge from the advertisement information provider by providing the advertisement information as additional information, conversely, information useful for the traffic information user may be provided as additional information to thereby increase the charge of utilizing traffic information as an amount of recompense therefor.

Embodiment 6

Figure 20:
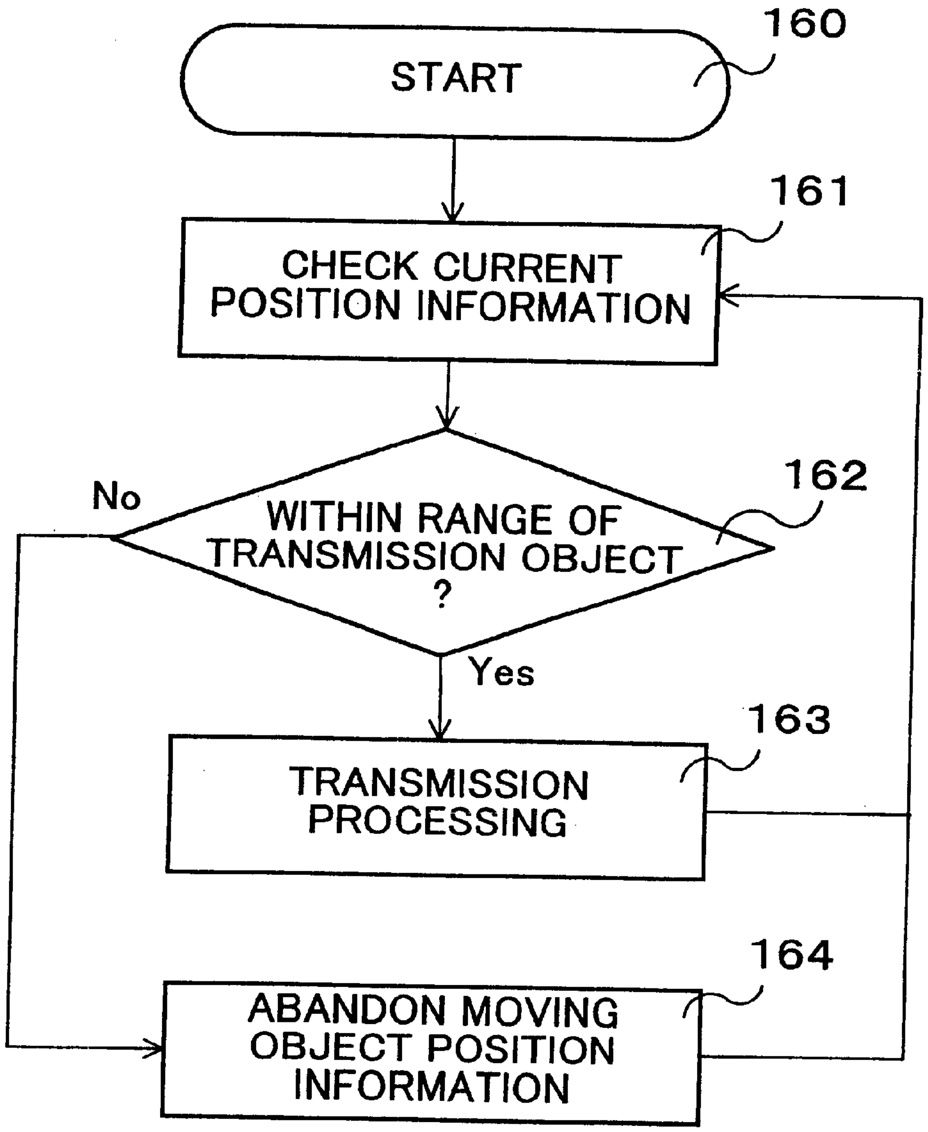
FIG. 20 is a flowchart of a processing of a current position detecting and transmitting apparatus according to Embodiment 6 of the invention.

Although according to the above-described embodiments, when current position information is transmitted from the moving object position detecting and transmitting apparatus 1, location of transmitting thereof and time of transmitting thereof are not limited but the current position information is transmitted from arbitrary location/time, according to Embodiment 6, the current position information is transmitted only under a specific condition. An explanation will be given of a processing of transmitting current position of the moving object position detecting and transmitting apparatus 1 according to Embodiment 6 in reference to a flowchart of a processing of FIG. 20.

First, current position information detected by the current position detecting apparatus 11 is checked (161) and it is determined whether the moving object is present in a transmission object range from the detected current position information (162). In this case, the transmission object range under a specific condition is a range in which a range of transmitting the current position information is set by latitude, longitude and height and is previously provided to the moving object position detecting and transmitting apparatus 11. When it is determined that the moving object is present in the transmission object range, there is carried out a transmission processing similar to that of Embodiment 1 (163) and when the moving object is not present in the transmission object range, there is carried out a processing of abandoning the detected current position information (164).

As described above, according to Embodiment 6, when the current position information of the moving object detected by the moving object position detecting and transmitting apparatus 1 is transmitted, the information is transmitted only in a specific range and therefore, a frequency of transmitting the current position information of the moving object is reduced and communication expense can be made inexpensive. By previously setting the transmission object range by the information center 2, the information center 2 can preponderantly collect the current position information of the moving object at a necessary location.

Further, although according to Embodiment 6, the transmission object range is set by latitude, longitude and height, otherwise, the transmission object range may be set by time, name of road or area of presence.

Further, although according to Embodiment 6, the transmission object range is previously set, the transmission object range may be dynamically changed by the moving object.

Further, the transmission object range may dynamically be changed by transmitting a signal of designating the transmission object range from the information center 2 to the respective moving objects.

Further, although according to Embodiment 6, transmission is carried out by determining whether the moving object position detecting and transmitting apparatus 1 is present in the transmission object range, the position information transmission request may be issued from the information center 2 to the respective moving object position detecting and transmitting apparatus 1 and the respective moving object position detecting and transmitting apparatus may transmit the current position information of the moving object in accordance with the transmission request. For example, it is possible that the transmission request is transmitted from the information center at every constant period of time or the transmission request is issued to the moving object at a periphery of a specific one of the portable telephone base station 5. In this case, although there is caused processing load of transmitting the transmission request to the respective moving object position detecting and transmitting apparatus by the information center, the information center can collect position information at necessary time and necessary location.

Further, when the moving object is brought under a specific condition as in Embodiment 6, by increasing the frequency of transmitting the current position information, the traffic information under the specific condition can be made further detailed and made further real time. Further, the transmission frequency can be realized to increase by transmitting the current position information at every predetermined period (predetermined time period, predetermined running distance) and shortening the predetermined period.

Embodiment 7

Figure 21:
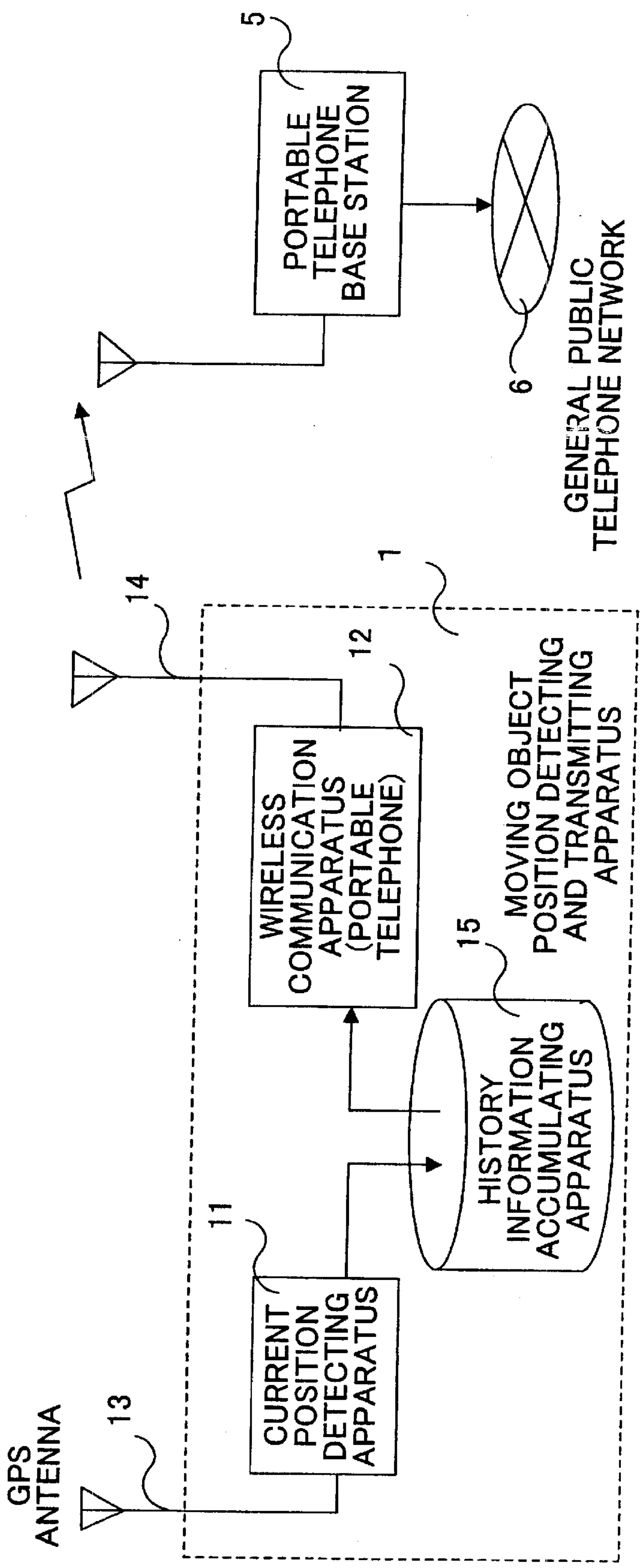
FIG. 21 is a partially detailed system constitution diagram of a history information transmitting system according to Embodiment 7 of the invention.

Although according to the above-described embodiments, the current position information detected at the position information detecting and transmitting apparatus 1 of the moving object is immediately transmitted, according to embodiment 7, the current position information of the position information detecting and transmitting apparatus 1 of the moving object is successively accumulated as history information and the accumulated history information is summarizingly transmitted to the information center 2. FIG. 21 shows a partially detailed system constitution diagram of a history information transmitting system according to Embodiment 7.

In FIG. 21, a history information accumulating apparatus 15 in the position information detecting and transmitting apparatus 1 of the moving object is realized by a semiconductor memory or a magnetic disk and there is carried out a processing of accumulating the current position information of the moving object detected by the current position detecting apparatus 11 by a method, described later, and transmitting history information of the accumulated current position information by a method, described later.

An explanation will be given of operation of the above-described constituent elements as follows.

An explanation will be given of an accumulation processing and a transmission processing of the history information accumulating apparatus 15 in reference to an accumulation format of FIG. 22 and a flowchart of a processing of FIG. 23. According to the accumulation format of FIG. 22, position information of the moving object is accumulated in FIFO (First In First Out) style and an amount of position information per detection is made constant. The history information accumulating apparatus 15 carries out a processing of firstly initializing accumulated data (171), thereafter receiving the current position information transmitted from the current position detecting apparatus 11 (172), carrying out a processing of accumulating the current position information by the accumulation format (173) and carrying out a processing of incrementing a counter of a number of times of accumulation (174). At this occasion, it is determined whether a value of the accumulated number of times counter becomes a value equal to or larger than a previously set upper limit value (175), when the counter becomes the value equal to or larger than the upper limit value, there is carried out a processing of transmitting the current position information accumulated up to the time by an accumulated number of times of counter from a front one thereof (176), accumulated data and the accumulated number of times of counter are reset (177) and thereafter, the operation returns to the processing of receiving the position information (174). When the accumulated number of times of counter does not reach the upper limit value, the operation returns to the processing of receiving the position information (172) as it is.

Further, although according to the above-described accumulation format, the amount of position detection is made constant, the amount may be a variable amount and in that case, there may be carried out a processing of calculating an accumulated data size for respective time and transmitting the accumulated data when the accumulated data size exceeds the upper limit value.

In this case, according to Embodiment 7, transmission of accumulated current position information at every predetermined time period, signifies transmission at every time that the accumulated number of times counter reaches a predetermined value or transmission at every time that the accumulated data size reaches a predetermined values.

Further, "at every predetermined period" is not limited only to the above-described significance but may naturally include a significance of "at every predetermined time period or at every predetermined running distance". In this case, the accumulated current position information is information accumulated within a predetermined time period or information accumulated in a period of running a predetermined running distance, which is transmitted at every predetermined time period.

As described above, according to Embodiment 7, there is provided the history information accumulating apparatus for accumulating the current position information of the moving object and transmitting the accumulated current position information and accordingly, a number of times of transmission of the moving object position detecting and transmitting apparatus can be reduced and therefore, transmission expense of the current position information can be reduced.

Further, although according to Embodiment 7, transmission of the current position information is started at every predetermined number of times of accumulation, every predetermined size of accumulated data or at every predetermined time period, as shown by Embodiment 6 described above, the accumulated current position information may be transmitted at specific location or specific time.

Similarly as shown by Embodiment 6, the transmission request may be transmitted from the information center 2 and the accumulated position information may be transmitted in accordance with the transmission request.

Figure 22:
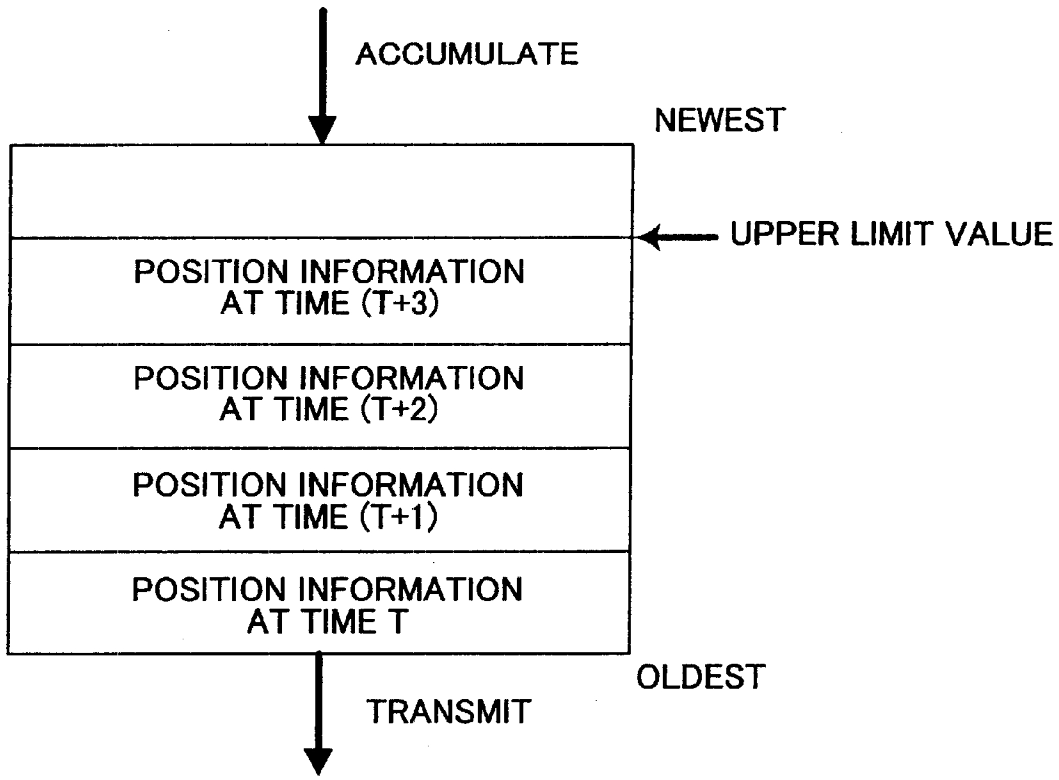
FIG. 22 shows an example of a history information accumulating format according to Embodiment 7 of the invention.
Figure 23:
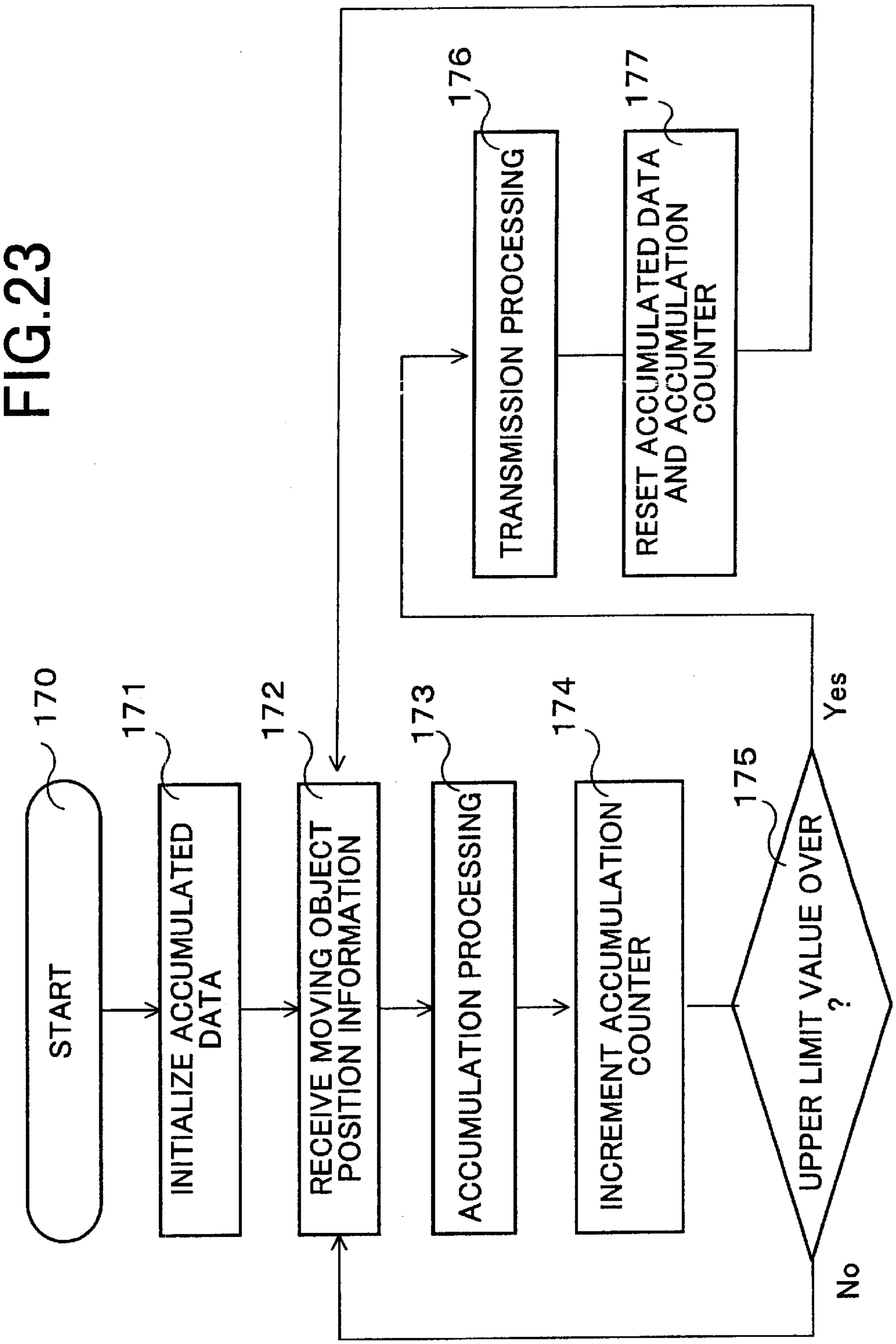
FIG. 23 is a flowchart of a processing of a history information accumulating apparatus according to Embodiment 7 of the invention.
Figure 24:
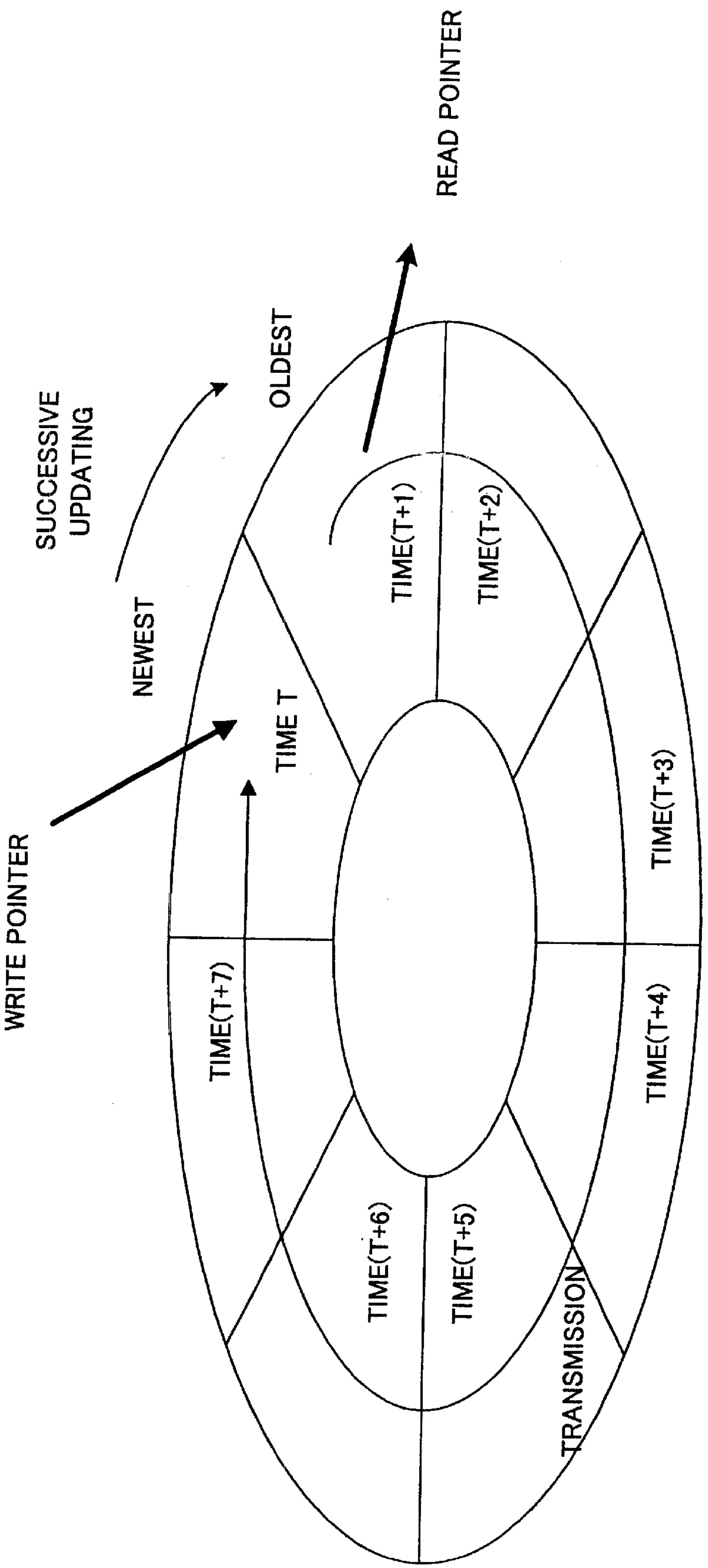
FIG. 24 shows an example of a history information accumulating format according to Embodiment 7 of the invention.

Further, although according to Embodiment 7, the accumulation format is of the FIFO style as shown by FIG. 22, the accumulation format may be a ring buffer style as shown by FIG. 24. In this case, as the accumulation processing, there is carried out a processing of accumulating data while updating oldest data by newest data and as transmission processing, there is carried out a processing of transmitting data to the information center from the oldest data earlier than the newest data updated by the accumulation processing by one data when there is brought about a transmission start state (time, location, request from information center).

Embodiment 8

Figure 25:
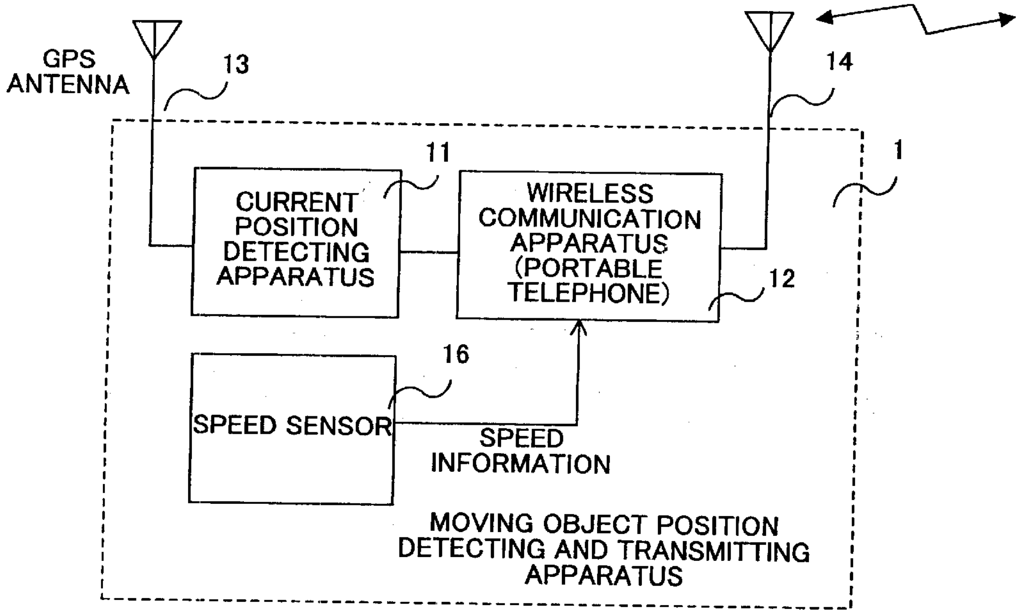
FIG. 25 shows an example of a constitution diagram of a moving object position detecting and transmitting apparatus according to Embodiment 8 of the invention.

Although according to the above-described embodiments, information transmitted from the moving object to the information center 2 is only the current position information of the moving object, according to Embodiment 8, moving object information with regard to the moving object per se or a periphery thereof is collected by monitoring means and the moving object information along with the current position information of the moving object are transmitted to the information center 2. FIG. 25 shows a system constitution diagram of Embodiment 8. In FIG. 25, a speed sensor 16 as monitoring means carried out a processing of detecting speed of the moving object and delivering the speed to the wireless communication apparatus 12 as moving object speed information. The wireless communication apparatus 12 carries out a processing of forming the current position information detected by the current position detecting apparatus 11 along with transmission information and transmitting the information to the information center 2 similar to Embodiment 1.

As described above, according to Embodiment 8, the moving object is provided with the speed sensor 16, the moving object speed information detected by the speed sensor 16 is transmitted to the information center 2 along with the current position information and therefore, when traffic information is formed at the traffic information forming apparatus 22 in the information center 2, a processing of calculating the moving object speed can be omitted and processing load in the information center 2 can be alleviated.

Figure 26:
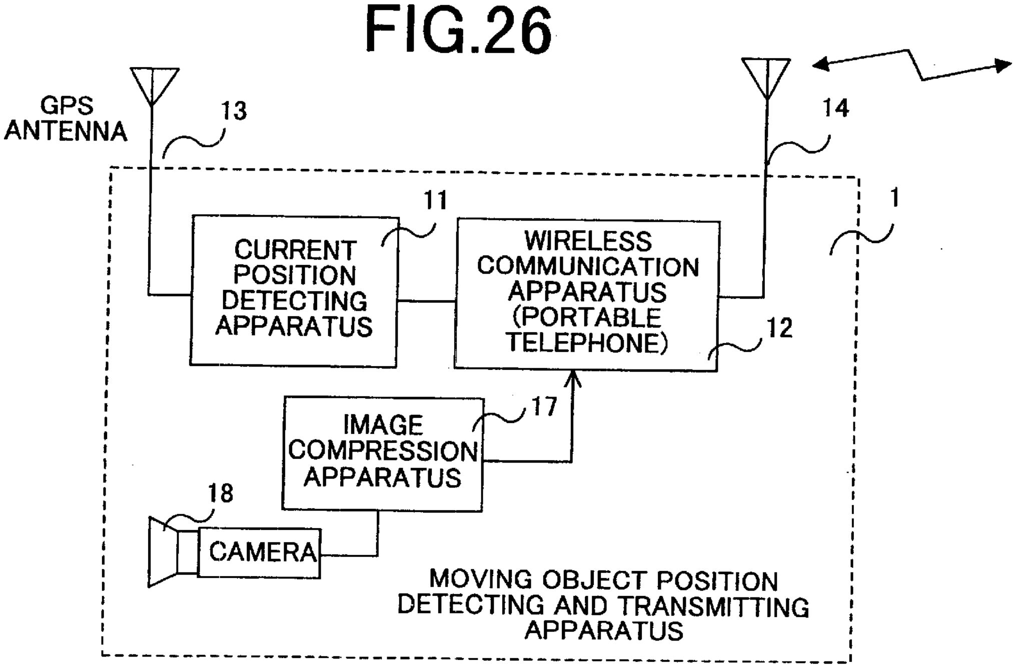
FIG. 26 shows an example of a constitution diagram of a moving object position detecting and transmitting apparatus according to Embodiment 8 of the invention.
Figure 27:
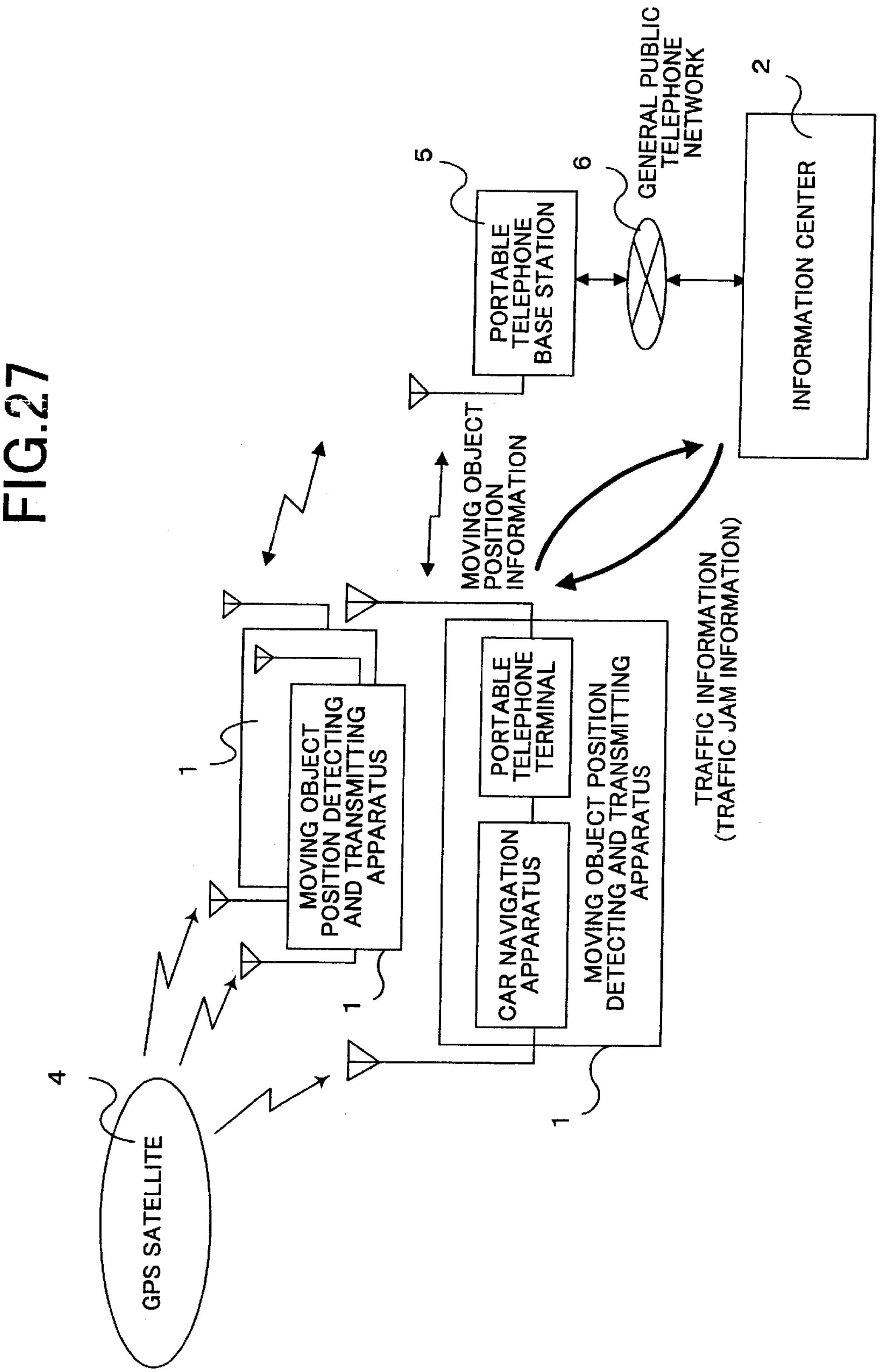
FIG. 27 is a system constitution diagram of a conventional traffic information collecting and distributing system.

Although according to Embodiment 8, there is exemplified moving object speed information as moving object information transmitted along with the current position information, moving object information detected by other sensor as monitoring means provided to the moving object may be transmitted to the information center 2. For example, by providing a camera 18 for photographing inside of the moving object or outside of the moving object as shown by FIG. 26 and an image compression apparatus 17 for subjecting image photographed by the camera 18 to digital compression and transmitting the current position information of the moving object along with image data, a situation at a periphery of the current position of the moving object can easily be grasped from image data. For example, by assuming an automobile as the moving object, transmitting image data of a road situation at the surrounding of the automobile taken by a camera attached to the automobile along with the current position information of the automobile, controlling the image data along with the current position information of the automobile by the information center 2 and distributing traffic information formed in accordance with the traffic information distribution request of the traffic information user along with the image data of the road constituting the distribution object, the traffic information user can easily to grasp road situation such as traffic jam or traffic accident.

Further, as monitoring means, other than the speed sensor or the camera, there is conceivable a sensor such as an angular velocity sensor (gyro sensor), an acceleration sensor, a temperature sensor or a microphone and by transmitting the moving object information detected thereby to the information center 2, the information center 2 can provide the traffic information user with traffic information having high added value.

Further, the moving object information provided previously to the moving object position detecting and transmitting apparatus 1 may be transmitted to the information center without providing an apparatus such as a sensor as in the above-described embodiment. Further, when the moving object position detecting and transmitting apparatus 1 is mounted to an automobile, personal information such as gender, age, address and taste of a driver can be previously provided to the moving object position detecting and transmitting apparatus 1.

Although as described above, according to the respective embodiments, the moving object position detecting and transmitting apparatus 1 is previously installed to the moving object, the information center (traffic information distributor) may distribute the moving object position detecting and transmitting apparatus 1 to a person desiring transmission of position information free of charge or at a price further inexpensive than normal price.

For example, at an initial stage of traffic information distributing business, a number of transmitters of the current position information is small and therefore, accuracy of formed traffic information is low and accordingly, firstly, during one month of starting the business of traffic information distribution, persons desiring transmission of the current position information are invited and the position detecting and transmitting apparatus 1 are distributed to all of desirers free of charge or at a price further inexpensive than normal purchase price.

When as described above, at the stage of starting the traffic information distribution business, the moving object position detecting and transmitting apparatus are distributed free of charge for a constant period of time, the traffic information service can be started smoothly.

Further, although according to the above-described, distribution object is constituted by all of persons desiring transmission of the current position information, the distribution object may be selected by the information center (traffic information distributor). For example, it is also possible that the distribution object is limited only to a certain area, transmitters at respective area are adjusted to be uniform or may be uniform with regard to ages of transmitters.

Further, the invention is not limited to the abovedescribed embodiments but can freely be modified in the range of the spirit of the invention.

What is claimed is:

1. A traffic information collecting and distributing system comprising:

a traffic information transmitting system for detecting and transmitting current position information for a moving object;

receiving means for receiving the current position information transmitted by the traffic information transmitting system;

traffic information forming means for forming traffic information based on the current position information received by the receiving means;

traffic information distribution means for distributing the traffic information to a traffic information user;

user identifying means for identifying the traffic information user with traffic identifying information; and charging means for making a charge to the traffic information user based on the traffic information user identifying information.

2. The traffic information collecting and distributing system according to claim 1 wherein the receiving means successively receives the current position information transmitted from the traffic information transmitting system.

3. The traffic information collecting and distributing system according to claim 1 wherein traffic information transmitting system identifying information is transmitted from the traffic information transmitting system and the charge is changed based on the traffic information transmitting system identifying information.

4. The traffic information collecting and distributing system according to claim 3 wherein the traffic information transmitting system identifying information relates to product information of the traffic information transmitting system.

5. The traffic information collecting and distributing system according to claim 3 wherein the traffic information transmitting system identifying information relates to presence or absence of the current position information.

6. The traffic information collecting and distributing system according to claim 1 wherein the charging means controls a quality and amount of traffic information distributed by the traffic information distributing means for respective traffic information users and make the charge in accordance with one of the quality and amount.

7. The traffic information collecting and distributing system according to claim 1 wherein the traffic information distributing means adds additional information to the traffic information formed by the traffic information forming means and distributes the additional information to the traffic information user and the charging means changes charge in accordance with the additional information.

8. The traffic information collecting and distributing system according to claim 7 wherein the additional information is advertisement information and the charging means makes the charge to a provider of the advertisement information.

9. The traffic information collecting and distributing system according to claim 1 wherein the receiving means receives accumulated current position information at respective period.

* * * * *